(12) United States Patent
Yamazaki

(10) Patent No.: US 9,751,371 B2
(45) Date of Patent: Sep. 5, 2017

(54) HYDRAULIC SHOCK ABSORBER

(71) Applicant: YAMAHA HATSUDOKI KABUSHIKI KAISHA, Iwata-shi, Shizuoka (JP)

(72) Inventor: Yutaka Yamazaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 8 days.

(21) Appl. No.: 15/024,403

(22) PCT Filed: Jul. 9, 2014

(86) PCT No.: PCT/JP2014/068280
§ 371 (c)(1),
(2) Date: Mar. 24, 2016

(87) PCT Pub. No.: WO2015/045558
PCT Pub. Date: Apr. 2, 2015

(65) Prior Publication Data
US 2016/0243913 A1    Aug. 25, 2016

(30) Foreign Application Priority Data

Sep. 25, 2013 (JP) .................. 2013-198036

(51) Int. Cl.
*B60G 13/06* (2006.01)
*B60G 17/08* (2006.01)
(Continued)

(52) U.S. Cl.
CPC ............ *B60G 13/06* (2013.01); *B60G 15/067* (2013.01); *B60G 17/08* (2013.01); *F16F 9/061* (2013.01);
(Continued)

(58) Field of Classification Search
CPC ........ F16F 9/20; F16F 9/36; F16F 9/32; F16F 9/061; F16F 9/063; F16F 9/348; B60G 13/06; B60G 17/08; B60G 13/08
See application file for complete search history.

(56) References Cited

U.S. PATENT DOCUMENTS

2009/0283373 A1* 11/2009 Satou .................. F16F 9/20
188/319.1

FOREIGN PATENT DOCUMENTS

EP    2 165 863 A1    3/2010
JP    48-21039 U    3/1973
(Continued)

OTHER PUBLICATIONS

Official Communication issued in International Patent Application No. PCT/JP2014/068280, mailed on Aug. 12, 2014.

*Primary Examiner* — Melanie Torres Williams
(74) *Attorney, Agent, or Firm* — Keating and Bennett, LLP

(57) ABSTRACT

A hydraulic shock absorber improves operability of a piston rod by providing an initial set load to the shock-absorbing rubber of a vehicle, and improves ride quality of the vehicle. The hydraulic shock absorber includes a cylinder, a first support member, a cover member, a main piston rod extending through the first support member, a sub piston rod, and a piston between the two piston rods. The hydraulic shock absorber further includes a free piston slidably fitted in the cylinder so that a pipe extends through the free piston. A first oil chamber and a second oil chamber on the two sides of the piston communicate with each other via a valve. A second support member partitions a second oil chamber and a third oil chamber, and the free piston partitions the third oil chamber and a gas chamber.

8 Claims, 12 Drawing Sheets

(51) Int. Cl.
  *B60G 15/06*    (2006.01)
  *F16F 9/06*    (2006.01)
  *F16F 9/54*    (2006.01)

(52) U.S. Cl.
  CPC ............ *F16F 9/063* (2013.01); *B60G 15/062* (2013.01); *B60G 2204/128* (2013.01); *B60G 2500/10* (2013.01); *B60G 2800/162* (2013.01); *F16F 9/54* (2013.01)

(56) References Cited

FOREIGN PATENT DOCUMENTS

| | | | | | |
|---|---|---|---|---|---|
| JP | 59-50808 | A | | 3/1984 | |
| JP | 2008223849 | A | * | 9/2008 | .............. F16F 9/061 |
| JP | 2008248955 | A | * | 10/2008 | |
| JP | 2009-127760 | A | | 6/2009 | |
| JP | 2010096347 | A | * | 4/2010 | ........... B60G 13/003 |
| JP | 2011-163537 | A | | 8/2011 | |
| JP | 4996957 | B2 | | 8/2012 | |
| JP | 2013-104497 | A | | 5/2013 | |
| JP | 2013-181586 | A | | 9/2013 | |
| KR | 20080042324 | A | * | 5/2008 | |

\* cited by examiner

HYDRAULIC SHOCK ABSORBER

BACKGROUND OF THE INVENTION

1. Field of the Invention

The present invention relates to a so-called, double-rod hydraulic shock absorber.

2. Description of the Related Art

Conventional hydraulic shock absorbers include a double-rod hydraulic shock absorber in which piston rods are installed on two sides of a piston. The piston rods of this double-rod hydraulic shock absorber are a main piston rod extending from the piston to one side, and a sub piston rod extending from the piston to the other side. The main piston rod extends through one of two oil chambers partitioned by the piston.

The sub piston rod extends through the other one of the two oil chambers. The main piston rod projects outside a cylinder from a first support member provided in one end portion of the cylinder. The sub piston rod extends through a partition in the cylinder, and is slidably supported by this partition. Therefore, the cylinder includes a first oil chamber positioned between the piston and first support member, and a second oil chamber positioned between the piston and partition. The first and second oil chambers communicate with each other via a passage in the piston. This passage includes a valve.

Conventional double-rod hydraulic shock absorbers of this type are described in, e.g., Japanese Patent No. 4996957 and Japanese Patent Publication No. 48-21039.

A hydraulic shock absorber described in Japanese Patent No. 4996957 includes piston rods in which the outer diameter of a sliding portion of a main piston rod is equal to that of a sliding portion of a sub piston rod. This hydraulic shock absorber also includes a pipe into which one end portion (this portion will be referred to as a sub piston rod hereinafter for convenience sake) of the piston rod extending through the above-described second oil chamber is inserted. The pipe includes a small-diameter portion and a large-diameter portion. The small-diameter portion has a diameter into which the sub piston rod is able to be inserted. One end portion of the small-diameter portion is fixed to a cover member to close the other end portion of the cylinder. The large-diameter portion is provided in the other end portion of the small-diameter portion. In this cover member, a communication path is provided that releases the internal air of the pipe to the atmosphere.

The large-diameter portion of the pipe is fitted in the inner circumferential surface of the cylinder. The large-diameter portion includes a ring-shaped guide member (second support member) defining the above-described partition, and a sealing member. The sealing member seals a portion between the second oil chamber and pipe.

A reservoir that compensates for temperature is provided between the large-diameter portion and cover member. When the volumes of the first and second oil chambers change due to a temperature change, or when the volume of the hydraulic oil changes, the reservoir replenishes the hydraulic oil to the second oil chamber or discharges the hydraulic oil therefrom.

The reservoir is defined by a third oil chamber communicating with the second oil chamber via a communication path, and a gas chamber partitioned from the third chamber by a free piston. The communication path that allows the second and third oil chambers to communicate with each other includes a recessed groove in the outer circumferential portion of the large-diameter portion of the pipe.

The free piston has a ring-shape, and is slidably fitted in the inner circumferential surface of the cylinder such that the pipe slidably extends through the free piston. A gas having a predetermined pressure is encapsulated in the gas chamber.

Like the hydraulic shock absorber disclosed in Japanese Patent No. 4996957, a hydraulic shock absorber described in Japanese Patent Publication No. 48-21039 includes a pipe into which a sub piston rod is inserted, and a reservoir that compensates for temperature. The pipe disclosed in Japanese Patent Publication No. 48-21039 is attached to a partition in a cylinder and to a cover member. The interior of the pipe is sealed. The partition is integral with the cylinder. The cylinder disclosed in Japanese Patent Publication No. 48-21039 is formed by threadably engaging two half portions split in the longitudinal direction. The partition is provided in the distal end portion of one half portion, and threadably engaged with the other half portion.

The partition includes a relief valve and a check valve. The relief valve opens to cause hydraulic oil to flow from a second oil chamber to a third oil chamber when the oil pressure of the second oil chamber rises. The check valve opens to cause the hydraulic oil to flow from the third oil chamber to the second oil chamber when the pressure of the second oil chamber becomes lower than a third pressure.

The hydraulic shock absorber disclosed in Japanese Patent No. 4996957 has the following difficulty in improving the ride quality of a vehicle when used in the vehicle.

The first problem is that a material having a high sealing ability must be used as the sealing member to seal the portion between the pipe and sub piston rod. This is because the interior of the pipe is released to the atmosphere. The sealing member must include the function of an oil seal to prevent leaking of the hydraulic oil from the second oil chamber, and the function of a dust seal to prevent the entrance of dust into the second oil chamber from inside the pipe. That is, the hydraulic shock absorber is disadvantageous in improving the ride quality of a vehicle because a sliding resistance generated when the sealing member comes into contact with the piston rod is high.

This inconvenience is able to be eliminated to some extent by improving the operability of the piston rod by making the dust seal unnecessary by sealing the interior of the pipe as disclosed in Japanese Patent Publication No. 48-21039. However, even the hydraulic shock absorber disclosed in Japanese Patent Publication No. 48-21039 cannot eliminate the following second problem.

In each of the hydraulic shock absorbers disclosed in Japanese Patent No. 4996957 and Japanese Patent Publication No. 48-21039, the outer diameter of the sliding portion of the main piston rod and that of the sliding portion of the sub piston rod are equal, so neither an expanding force nor a contracting force is generated. When using this hydraulic shock absorber in a suspension of a vehicle, a shock-absorbing rubber is interposed between one end portion of the hydraulic shock absorber and the body of the vehicle. A shock-absorbing rubber is also interposed between the other end portion of the hydraulic shock absorber and a member of the suspension, which moves together with a wheel with respect to the body of the vehicle. In each of the hydraulic shock absorbers disclosed in Japanese Patent No. 4996957 and Japanese Patent Publication No. 48-21039, neither an expanding force nor a contracting force is generated as described above, so no initial set load is provided to the shock-absorbing rubber. The initial set load is a load which elastically deforms the shock-absorbing rubber when the hydraulic shock absorber is not in operation. The second problem is that the responsiveness decreases because the hydraulic shock absorber expands or contracts after the shock-absorbing rubber deforms due to the displacement of the body of the vehicle. That is, since the hydraulic shock absorber operates later than the displacement of the body of the vehicle, the ride quality of the vehicle cannot be improved.

The initial set load is able to be provided to the shock-absorbing rubber by making the outer diameter of the sliding portion of the main piston rod smaller or larger than that of the sliding portion of the sub piston rod. By using this arrangement, the pressure-receiving areas of the first and second oil chambers of the piston become different from each other. The hydraulic oil is pressurized by the pressure of the gas in the gas chamber. Therefore, the piston is pushed toward the side having a smaller pressure-receiving area by a gas reaction force equivalent to the difference between the pressure-receiving areas. That is, the initial set load is provided to the shock-absorbing rubber because the hydraulic shock absorber expands or contracts in a natural state.

Unfortunately, this configuration cannot be applied to each of the hydraulic shock absorbers described in Japanese Patent No. 4996957 and Japanese Patent Publication No. 48-21039 for a structural reason. In this hydraulic shock absorber, if the outer diameter of the sliding portion of the main piston rod is made smaller or larger than that of the sliding portion of the sub piston rod, a large amount of hydraulic oil necessarily flows from the second oil chamber to the third oil chamber, or vice versa, as the piston moves. However, no sufficient passage area is able to be provided in each of the hydraulic shock absorbers described in Japanese Patent No. 4996957 and Japanese Patent Publication No. 48-21039.

That is, in the hydraulic shock absorber described in Japanese Patent No. 4996957, the communication path that allows the second and third oil chambers to communicate with each other includes a recessed groove in the outer circumferential portion of the large-diameter portion of the pipe. The ring-shaped guide member defining the partition is fitted in the inner circumferential portion of the large-diameter portion of the pipe. Therefore, the thickness of the pipe is small. It is difficult to provide a communication path having a sufficient passage area in this pipe. Since a large amount of hydraulic oil cannot flow through this communication path when the piston moves, cavitation may occur in the oil chamber. The communication path cannot have a large cross-sectional area by which no cavitation occurs, because the cross-sectional area is restricted by the thickness of the pipe.

In the hydraulic shock absorber described in Japanese Patent Publication No. 48-21039, the relief valve and the check valve are arranged between the second and third oil chambers. Accordingly, a large amount of hydraulic oil cannot freely flow between the second and third oil chambers of this hydraulic shock absorber.

SUMMARY OF THE INVENTION

Preferred embodiments of the present invention eliminate the problems described above, and provide hydraulic shock absorbers that are able to improve the operability of a piston rod by providing an initial set load to the shock-absorbing rubber of a vehicle, and able to improve the ride quality of the vehicle.

A preferred embodiment of the hydraulic shock absorber includes a cylinder, a first support member provided at a first end portion of the cylinder, a cover member that closes a second end portion of the cylinder, a main piston rod slidably extending through the first support member, a sub piston rod positioned on a same axis as that of the main piston rod, and connected to a first end portion of the main piston rod which is positioned inside the cylinder, a pipe arranged in the cylinder in a state in which the pipe is positioned on the same axis as that of the main piston rod and the sub piston rod, and including a first end portion fixed to the cover member and a second end portion into which a distal end portion of the sub piston rod is inserted, a second support member fixed to the second end portion of the pipe, and including an outer circumferential portion having a diameter larger than a diameter of the pipe and is fitted on an inner circumferential surface of the cylinder, and an inner circumferential portion which slidably supports the distal end portion of the sub piston rod, a piston slidably fitted in the cylinder in a state in which the piston is fixed between the main piston rod and the sub piston rod, and defining a first oil chamber between the piston and the first support member and a second oil chamber between the piston and the second support member, a free piston slidably fitted between the pipe and cylinder such that the pipe extends through the free piston, and defining a third oil chamber between the free piston and the second support member and a gas chamber between the free piston and the cover member, a first hydraulic oil passage that communicates the first oil chamber with the second oil chamber, a valve in the first hydraulic oil passage, and a second hydraulic oil passage in the second support member such that hydraulic oil is able to freely pass, and communicates the second oil chamber with the third oil chamber, wherein the first oil chamber, the second oil chamber, and the third oil chamber are filled with the hydraulic oil, the gas chamber is filled with a gas having a pressure which pushes the free piston toward the second support member, a space in the pipe is a closed space, an outer diameter of a sliding portion of the main piston rod differs from an outer diameter of a sliding portion of the sub piston rod, and a total cross-sectional area of the second hydraulic oil passage is equal to or larger than a difference between a cross-sectional area of the sliding portion of the main piston rod and a cross-sectional area of the sliding portion of the sub piston rod.

In a preferred embodiment of the present invention, no dust enters the pipe from outside because the interior of the pipe is sealed, so a member that does not have a dust seal function is able to be used as the sealing member to seal the portion between the second support member and the sub piston rod. When compared to a case in which a member having a dust seal function is used as the sealing member, therefore, the sliding resistance of the sub piston rod is reduced, and the operability of the hydraulic shock absorber improves.

In the hydraulic shock absorber according to a preferred embodiment of the present invention, the outer diameter of the sliding portion of the main piston rod is smaller or larger than an outer diameter of the sliding portion of the sub piston rod. Accordingly, the pressure-receiving areas of the first and second oil chambers of the piston are not equal. Hydraulic oil is pressurized by the pressure of a gas in the gas chamber. Therefore, the piston is pushed toward the side having a smaller pressure-receiving area by a gas reaction force equivalent to the difference between the pressure-receiving areas. That is, this hydraulic shock absorber expands or contracts in a natural state.

When using the hydraulic shock absorber in a suspension of a vehicle, a shock-absorbing rubber is interposed between the body of the vehicle and one end portion of the hydraulic shock absorber, and another shock-absorbing rubber is interposed between a member which moves together with a wheel with respect to the body of the vehicle and the other end portion of the hydraulic shock absorber. When a suspension spring that supports the vehicle body is installed independently of the hydraulic shock absorber, an initial set load is provided to each of the shock-absorbing rubber connected to one end portion of the hydraulic shock absorber, and the shock-absorbing rubber connected to the other end portion thereof. On the other hand, if the suspension spring is installed between the vehicle body and the cylinder or the main piston rod connected to the wheel side of the hydraulic shock absorber, the initial set load is provided to the shock-absorbing rubber connected to one end portion of the hydraulic shock absorber, and the weight of the vehicle is provided as a load to the shock-absorbing rubber connected to the other end portion thereof.

In a case in which the hydraulic shock absorber expands in the natural state, when the vehicle body displaces downward (a direction in which the total length of the hydraulic shock absorber decreases) with respect to a wheel, for example, the hydraulic shock absorber generates a damping force almost simultaneously with the displacement of the vehicle body. On the other hand, in a case in which the hydraulic shock absorber contracts in the natural state, when the vehicle body displaces upward (a direction in which the total length of the hydraulic shock absorber increases) with respect to the wheel, the hydraulic shock absorber generates a damping force almost simultaneously with the displacement of the vehicle body. The hydraulic shock absorbers described in Japanese Patent No. 4996957 and Japanese Patent Publication No. 48-21039 cannot perform a highly responsive operation like this.

When the piston moves with respect to the cylinder in the hydraulic shock absorber according to preferred embodiments of the present invention, hydraulic oil flows through the second hydraulic oil passage at a flow rate equivalent to the difference between the cross-sectional areas of the sliding portions of the main and sub piston rods. The total cross-sectional area of this second hydraulic oil passage is equal to or larger than the difference between the cross-sectional areas of the sliding portions of the main and sub piston rods. Accordingly, a large amount of hydraulic oil smoothly flows through the second hydraulic oil passage as the piston moves, so no cavitation occurs in the oil chamber even when the moving velocity of the piston is high.

Accordingly, hydraulic shock absorbers according to preferred embodiments of the present invention increase the operability of the piston rod, and are able to provide an initial set load to the shock-absorbing rubber of a vehicle while preventing cavitation in the oil chamber. Consequently, preferred embodiments of the present invention provide hydraulic shock absorbers that are able to improve the ride quality of a vehicle because a damping force is generated with high responsiveness to the behavior of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of a hydraulic shock absorber according to the present invention will be explained in detail below with reference to FIGS. 1 to 9C.

Figure 1:
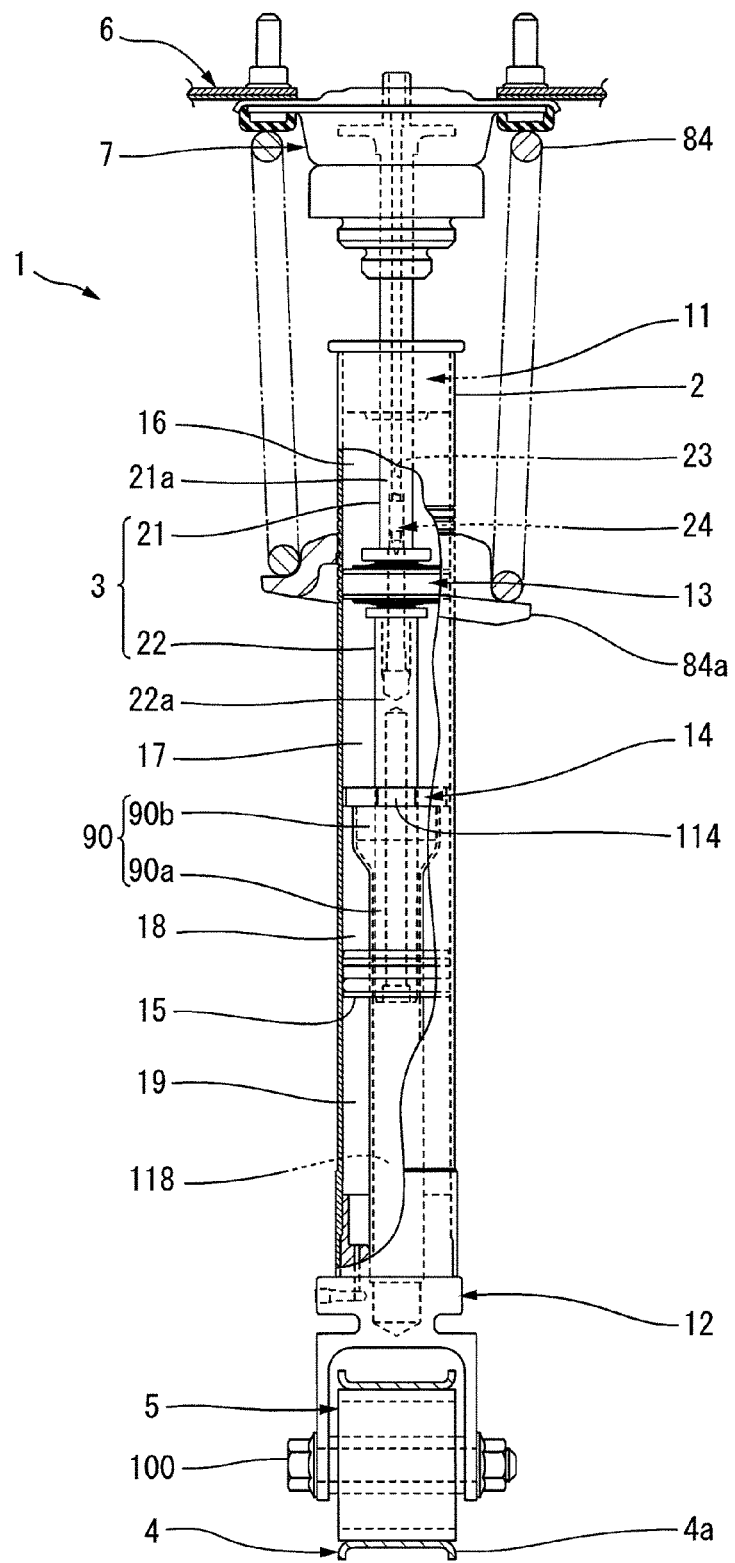
FIG. 1 is a front view of a hydraulic shock absorber according to a preferred embodiment of the present invention, and shows a state in which a cylinder is partially cut away.

A hydraulic shock absorber 1 shown in FIG. 1 includes a cylinder 2, and a piston rod 3 projecting from one end portion (the upper end portion in FIG. 1) of the cylinder 2. The hydraulic shock absorber 1 according to the present preferred embodiment is preferably used in a vehicle such as an automobile (not shown), for example. The cylinder 2 shown in FIG. 1 is connected to a member (e.g., a lower arm 4) of a suspension of the vehicle, which moves together with a wheel with respect to the body of the vehicle, via a wheel-side connecting member 5 (to be described below).

The piston rod 3 is connected to a body 6 of the vehicle via a body-side connecting member 7. Note that when installing the hydraulic shock absorber 1 in the vehicle, it is also possible to use a piston rod 3 that is connected to a member (e.g., the lower arm 4) of the suspension, which moves together with a wheel, and the cylinder 2 is connected to the body 6. In the explanation of the hydraulic shock absorber 1 according to the present preferred embodiment, a portion positioned in the upper half of FIG. 1 will be called an upper portion of the hydraulic shock absorber 1, and a portion positioned in the lower half of FIG. 1 will be called a lower portion of the hydraulic shock absorber 1.

The cylinder 2 of the hydraulic shock absorber 1 is preferably a circular cylinder. A first support member 11 is provided in the upper end portion (an end portion positioned in the upper half of FIG. 1) of the cylinder 2, and the lower end portion thereof is closed with a cover member 12.

As will be described in detail below, first to third oil chambers 16 to 18 and a gas chamber 19 partitioned by a piston 13, a second support member 14, a free piston 15, and the like are provided in the cylinder 2 of the hydraulic shock absorber 1. The first to third oil chambers 16 to 18 are filled with hydraulic oil. The gas chamber 19 is filled with a gas having a predetermined pressure. As an example of this gas, $N_2$ gas or the like is preferably used.

The piston rod 3 includes a main piston rod 21 slidably extending through the first support member 11, and a sub piston rod 22 connected to the lower end portion of the main piston rod 21, i.e., one end portion positioned in the cylinder 2. The sub piston rod 22 extends through the second support member 14 (to be described below), and is slidably supported by the second support member 14.

The outer diameter of a sliding portion 21a (a portion slidably extending through the first support member 11) of the main piston rod 21 differs from an outer diameter of a sliding portion 22a (a portion slidably extending through the second support member 14) of the sub piston rod 22. In the present preferred embodiment, the outer diameter of the sliding portion 22a of the sub piston rod 22 is larger than the outer diameter of the sliding portion 21a of the main piston rod 21. Also, the sub piston rod 22 is positioned on the same axis as that of the main piston rod 21.

A through hole 23 extending from one end to the other of the main piston rod 21 is provided in the axial portion of the main piston rod 21. An adjustable valve 24 (to be described below) is provided in the through hole 23.

Figure 2:
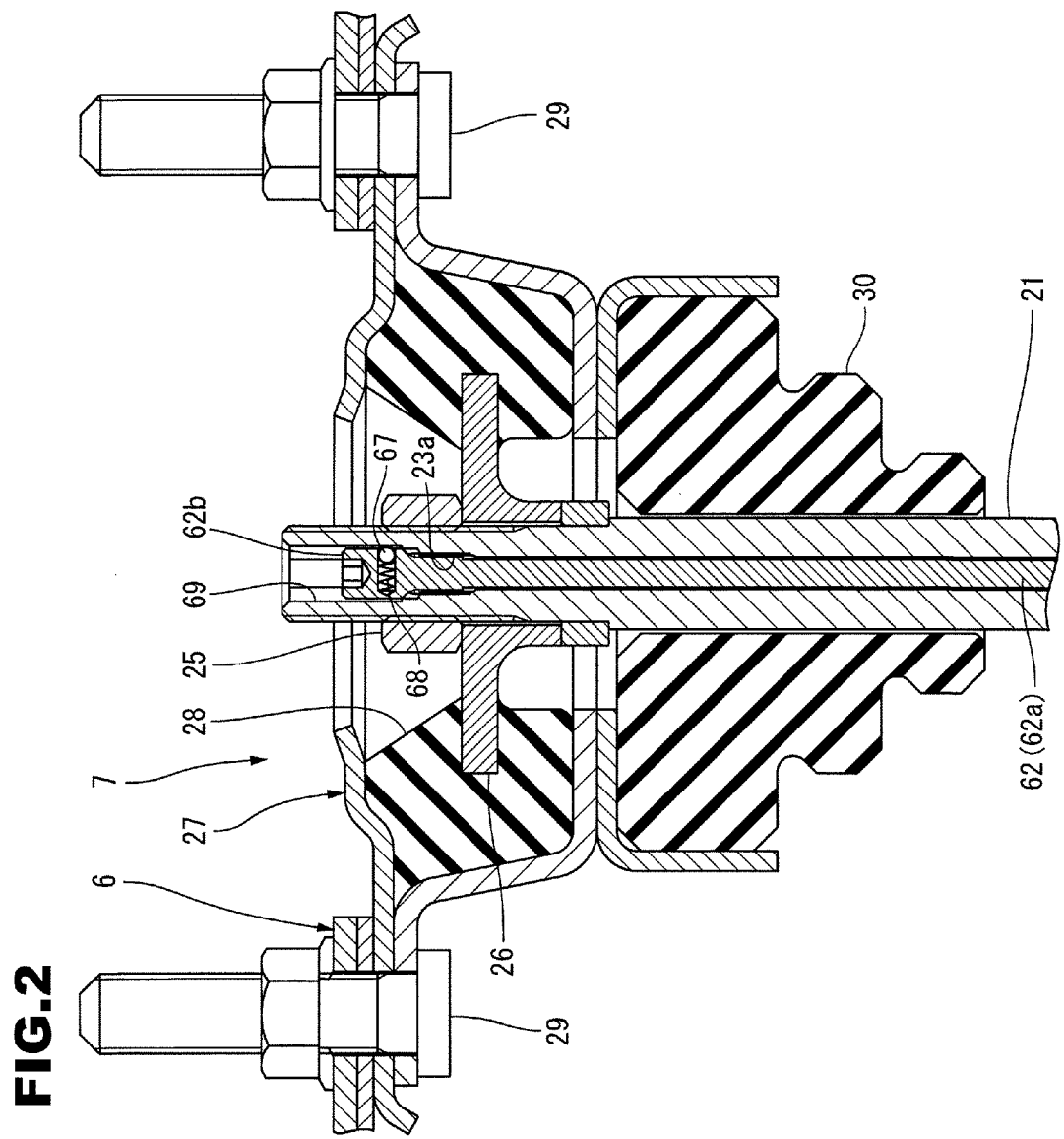
FIG. 2 is a cross-sectional view showing a connecting portion between a main piston rod and the body of a vehicle in an enlarged scale.

As shown in FIG. 2, the body-side connecting member 7 is attached to the upper end portion of the main piston rod 21.

The body-side connecting member 7 includes a disk-shaped connecting plate 26 fixed to the upper end portion of the main piston rod 21 by a lock nut 25, a housing 27 surrounding the connecting plate 26, and shock-absorbing rubber 28 provided in the housing 27. The housing 27 is fixed to the body 6 by fixing bolts 29, for example.

The shock-absorbing rubber 28 is injected into the housing 27 and baked in a state in which the connecting plate 26 is positioned inside the housing 27. The shock-absorbing rubber 28 covers the outer circumferential portion of the connecting plate 26 from two sides in the vertical direction.

A rubber member 30 is provided in the lower end portion of the housing 27. When the hydraulic shock absorber 1 largely contracts, the rubber member 30 is sandwiched between the housing 27 and a cap 76 (see FIG. 5) (to be described below) and reduces a shock.

Figure 3:
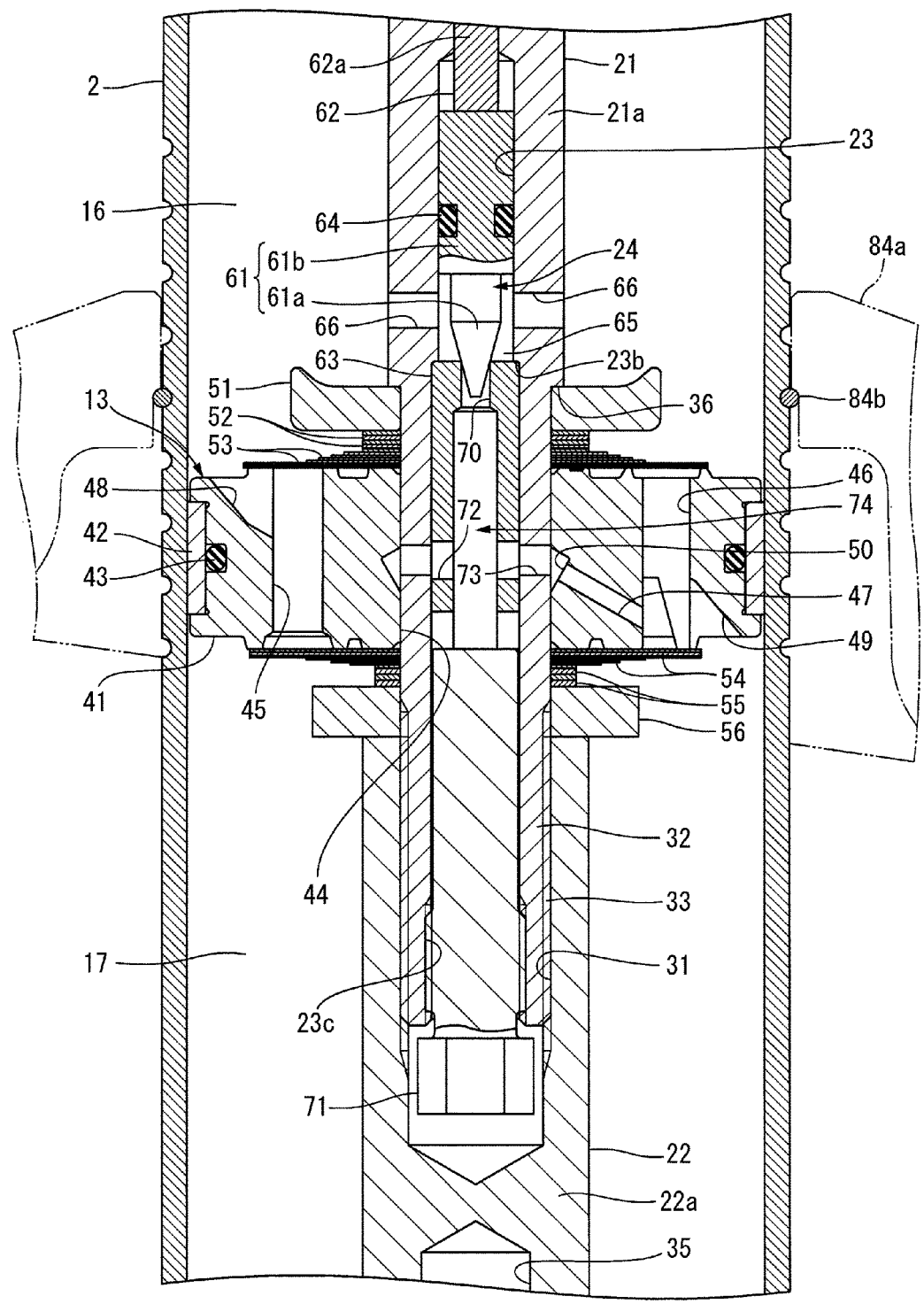
FIG. 3 is a cross-sectional view showing a connecting portion between the main piston rod and a sub piston rod in an enlarged scale.

As shown in FIG. 3, a female screw 31 is provided in the upper end portion of the sub piston rod 22. A male screw 33 is provided in a lower end portion 32 of the main piston rod 21. The main piston rod 21 and the sub piston rod 22 are connected by screwing the female screw 31 of the sub piston rod 22 onto the male screw 33 of the main piston rod 21. When screwing the female screw 31 onto the male screw 33, the rotation of the main piston rod 21 is first regulated by clamping the main piston rod 21 by a clamping device (not shown). After that, a tool is engaged with a hexagonal hole 34 (see FIG. 7) provided in the lower end portion of the sub piston rod 22. Then, the sub piston rod 22 is rotated by using this tool, and the female screw 31 is screwed onto the male screw 31. A non-through hole 35 for weight reduction is provided in a portion which is the axial portion of the sub piston rod 22 according to the present preferred embodiment and positioned between the vicinity of the female screw 31 and the hexagonal hole 34.

The lower end portion 32 including the male screw 33 of the main piston rod 21 is narrowed to define a step with respect to the sliding portion 21a of the main piston rod 21. An axial-direction end surface 36 facing down is provided in the boundary between the lower end portion 32 of the main piston rod 21 and the sliding portion 21a of the main piston rod 21. The work of connecting the main piston rod 21 and the sub piston rod 22 is performed in a state in which the piston 13 and a plate-shaped member (to be described below) around the piston are sandwiched between the axial-direction end surface 36 and the sub piston rod 22. That is, the piston 13 is fixed between the main piston rod 21 and the sub piston rod 22.

The piston 13 defines the first oil chamber 16 between the piston 13 and the first support member 11, and the second oil chamber 17 between the piston 13 and the second support member 14 (see FIGS. 1 and 7) (to be described below) provided inside the cylinder 2. As shown in FIG. 3, the piston 13 according to the present preferred embodiment includes a piston body 41 having a ring-shape, and a ring-shaped bearing 42 and O-ring 43 provided on the outer circumferential portion of the piston body 41. The bearing 42 smoothens the sliding between the piston 13 and the cylinder 2. The O-ring 43 seals a portion between the inner circumferential surface of the bearing 42 and the piston 13.

The piston body 41 includes a through hole 44 in which the lower end portion 32 of the main piston rod 21 is fitted, and a plurality of oil holes (to be described below). The through hole 44 is positioned in the axial portion of the piston body 41. The plurality of oil holes include a tension-side oil hole 45 extending through the left side of the piston 13 in FIG. 3 in the axial direction, a compression-side oil hole 46 extending through the right side of the piston 13 in FIG. 3 in the axial direction, and a communication hole 47 extending from the compression-side oil hole 46 to the axial portion of the piston 13. A plurality of tension-side oil holes 45 and a plurality of compression-side oil holes 46 are alternately arranged at appropriate intervals in the circumferential direction of the piston body 41.

One end portion (an end portion facing the first oil chamber 16) of the tension-side oil hole 45 is connected to the first oil chamber 16 via a communication hole 48 in the piston body 41. One end portion (an end portion facing the second oil chamber 17) of the compression-side oil hole 46 is connected to the second oil chamber 17 via a communication hole 49 in the piston body 41. In the present preferred embodiment, the tension-side oil hole 45, communication hole 48, the compression-side oil hole 46, and the communication hole 49 define "a first hydraulic oil passage".

The communication hole 47 defines a portion of a hydraulic oil passage that guides hydraulic oil to the adjustable valve 24 (to be described below). The communication hole 47 allows a ring groove 50 in the through hole 44 of the piston body 41 and the compression-side oil hole 46 to communicate with each other.

The piston body 41 according to the present preferred embodiment is sandwiched and fixed, together with a plurality of plate-shaped members, between the axial-direction end surface 36 described above and the upper end surface of the sub piston rod 22, in a state in which the lower end portion 32 of the main piston rod 21 is fitted in the through hole 44. A ring-shaped plate 51, a plurality of shims 52, and a plurality of disk-shaped first leaf springs 53 are sandwiched between the piston 13 and the axial-direction end surface 36. A plurality of disk-shaped second leaf springs 54, a plurality of shims 55, and a washer 56 are sandwiched between the piston 13 and the sub piston rod 22. The plate 51 abuts against the stopper rubber 83 (see FIG. 5) when the hydraulic shock absorber 1 expands the most.

The first leaf springs 53 close those openings of the tension-side oil hole 45 and the compression-side oil hole 46 in the piston 13 which face the first oil chamber 16. The second leaf springs 54 close those openings of the tension-side oil hole 45 and the compression-side oil holes 46 which face the second oil chamber 17. In the present preferred embodiment, the first leaf springs 53 and the second leaf springs 54 define "a valve in the first hydraulic oil passage".

Figure 4:
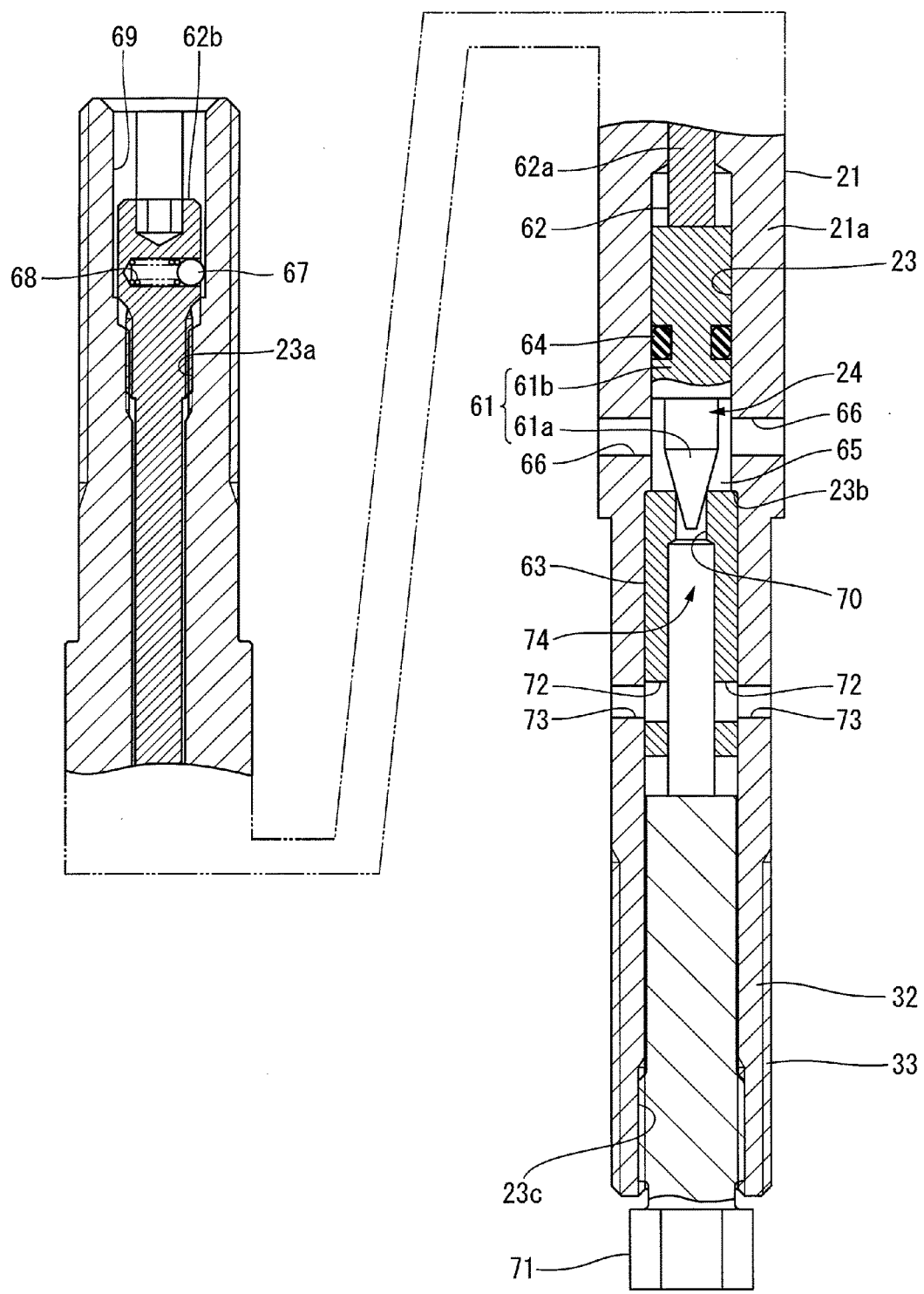
FIG. 4 is a cross-sectional view of the main piston rod for explaining an adjustable valve.

The adjustable valve 24 in the main piston rod 21 will be explained below. As shown in FIG. 4, the adjustable valve 24 according to the present preferred embodiment includes a valve body 61 movably fitted in the through hole 23 of the main piston rod 21, an operation rod 62 independent of the valve body 61, and a valve seat member 63 on which the valve body 61 is seated.

The valve body 61 includes a main body 61a having a conical shape whose distal end narrows toward the valve seat member 63, and a columnar portion 61b integral with the main body 61a. The operation rod 62 includes a rod portion 62a including a lower end which abuts against the columnar portion 61b, and extends to the vicinity of the upper end of the main piston rod 21, and an operation portion 62b in the upper end portion of the rod portion 62a.

The columnar portion 61b includes an O-ring 64 that seals a portion between the columnar portion 61b and the through hole 23 of the main piston rod 21. The columnar portion 61b is fitted in the through hole 23 of the main piston rod 21. An oil chamber 65 accommodating the main body 61a is arranged in a portion of the through hole 23, which is below the columnar portion 61b and between the columnar portion 61b and the valve seat member 63 (to be described below). The oil chamber 65 communicates with the first oil chamber 16 via an oil hole 66 in the main piston rod 21.

The operation portion 62b defines a screw including a hexagonal hole, and is threadably engaged with a female screw 23a provided in the hole wall surface of the upper end portion of the through hole 23. The operation portion 62b also includes a ball 67 that regulates the rotation of the operation rod 62. The ball 67 is pushed against a hexagonal hole 69 of the main piston rod 21 by a compression coil spring 68. When the screw is fastened by rotating the operation portion 62b, the valve body 61 moves forward to the valve seat member 63 (to be described below). The pressure of hydraulic oil acts on the valve body 61. This pressure is the internal pressure of the gas chamber 19, which is propagated via the hydraulic oil by the pressures of the first oil chamber 16 and the second oil chamber 17. Therefore, when the screw is loosened by rotating the operation portion 62b, the valve body 61 moves backward in the direction away from the valve seat member 63.

The valve seat 63 preferably has a closed-end cylindrical shape, and fitted in the through hole 23 of the main piston rod 21 such that the bottom portion is positioned on the upper side (the side of the valve body 61). An oil hole 70 into which the valve body 61 is inserted is provided in the bottom portion of the valve seat member 63.

The open end (lower end) of the valve seat member 63 is pushed upward by a fixing bolt 71, and the bottom portion (upper end) thereof is pushed from below by a step 23b of the through hole 23. The fixing bolt 71 is screwed into a female screw 23c in the lower end portion of the through hole 23 to close the lower end of the through hole 23.

A plurality of oil holes 72 which define the hollow portion of the valve seat member 63 communicate with the outside are provided in the circumferential wall of the valve seat member 63. The oil holes 72 are located in positions corresponding to the ring groove 50 of the piston 13. The oil holes 72 and the ring groove 50 communicate with each other via the oil hole 73 in the main piston rod 21. That is, the first oil chamber 16 and the second oil chamber 17 of the hydraulic shock absorber 1 communicate with each other via a hydraulic oil passage 74 including the through hole 23 in the main piston rod 21, and the adjustable valve 24, in addition to the tension-side oil hole 45 and the compression-side oil hole 46 of the piston 13.

The hydraulic oil passage 74 including the through hole 23 includes the communication holes 49 and 47 and the ring groove 50 of the piston 13, the oil holes 66 and 73 of the main piston rod 21, the oil holes 70 and 72 and the hollow portion of the valve seat member 63, and the oil chamber 65. The hydraulic oil passage 74 including the through hole 23 defines "a third hydraulic oil passage".

The adjustable valve 24 is fully closed when the valve body 61 is pushed against the opening edge of the oil hole 70 of the valve seat member 63. Also, the adjustable valve 24 functions as a valve because a gap is provided between the opening edge of the oil hole 70 of the valve seat member 63 and the valve body 61. The throttling amount is able to be adjusted by moving the valve body 61 in the axial direction by rotating the operation portion 62b, thus changing the cross-sectional area of the above-described gap. That is, the adjustable valve 24 is able to change the cross-sectional area of the third hydraulic oil passage.

Figure 5:
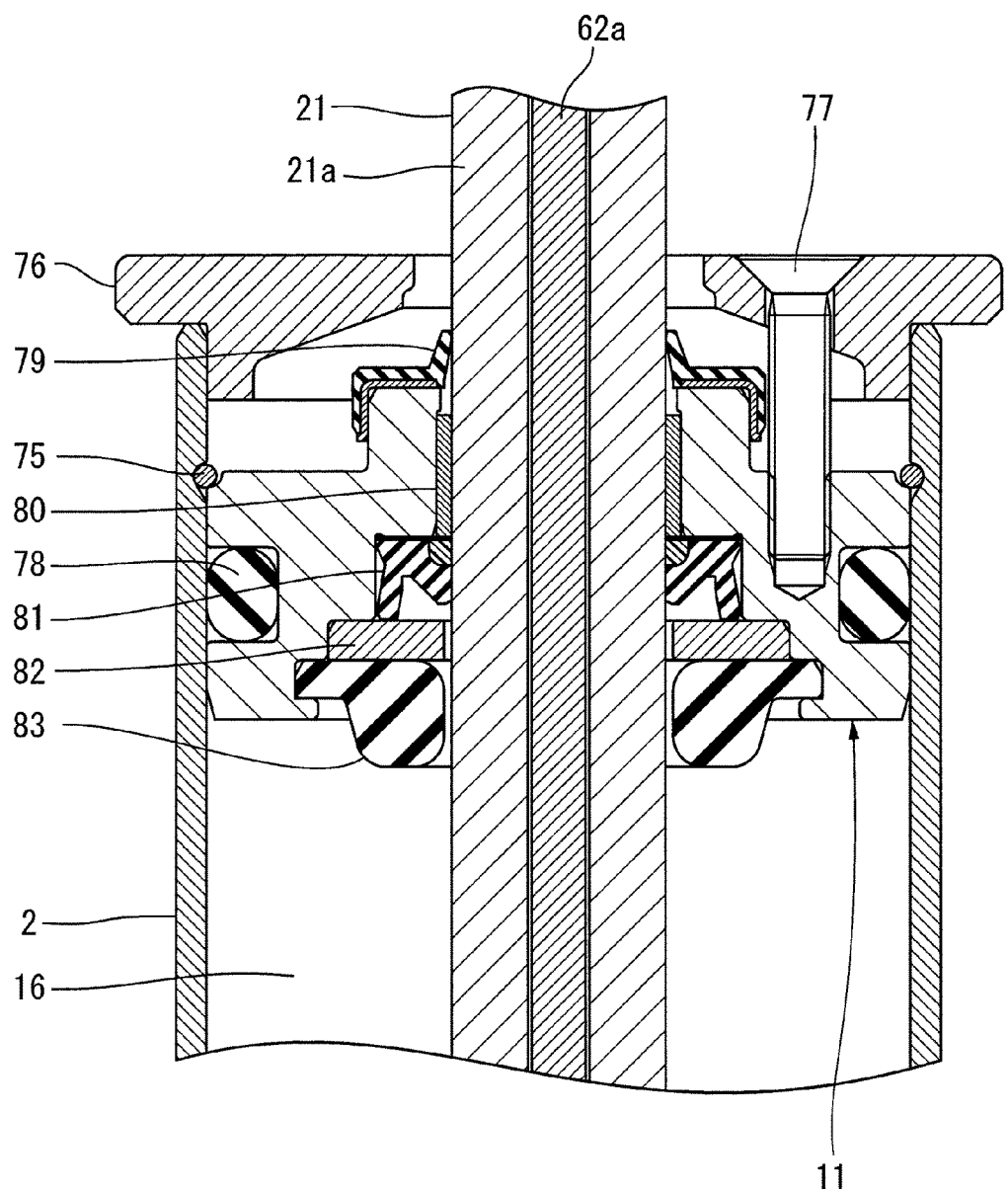
FIG. 5 is a cross-sectional view showing a first support member in an enlarged scale.

As shown in FIG. 5, the first support member 11 provided at one end portion of the cylinder 2 preferably has a ring shape. Also, the first support member 11 is supported by the cylinder 2 such that the main piston rod 21 slidably extends through the hollow portion, and the outer circumferential portion is fitted in the cylinder 2. The first support member 11 is unmovably fixed to the cylinder 2 by a circlip 75 fixed to the inner circumferential portion of the cylinder 2, and a cap 76 which abuts against the outer end surface of the cylinder 2. The cap 76 is attached to the first support member 11 by a plurality of fixing bolts 77, for example.

An O-ring 78 that seals a portion between the first support member 11 and cylinder 2 is attached to the outer circumferential portion of the first support member 11. A plurality of members are attached to the inner circumferential portion of the first support member 11 as they are arranged in the axial direction. These members include a dust seal 79, a bearing 80, an oil seal 81, a washer 82, and a stopper rubber 83, in this order from above in FIG. 5. The dust seal 79 prevents foreign bodies such as dust and water from entering the interior from the portion where the main piston rod 21 extends through the first support member 11.

The bearing 80 is press-fitted, for example, in the first support member 11, and slidably supports the main piston rod 21. The oil seal 81 prevents hydraulic oil in the cylinder 2 (in the first oil chamber 16) from leaking outside through the portion through which the main piston rod 21 extends. The washer 82 supports the stopper rubber 83. The stopper rubber 83 reduces a shock when the hydraulic shock absorber 1 expands the most. When the hydraulic shock absorber 1 expands the most, the plate 51 fixed to the main piston rod 21 abuts against the stopper rubber 83.

As shown in FIG. 1, a spring receiving member 84a (see FIG. 1) that supports a coil spring 84 of the suspension is attached to the upper portion of the cylinder 2 by a C-ring 84b (see FIG. 3). The coil spring 84 is installed as it is compressed between the body of the vehicle and the spring receiving member 84a. Note that the coil spring 84 of the suspension may also be installed independently of the hydraulic shock absorber 1.

Figure 6:
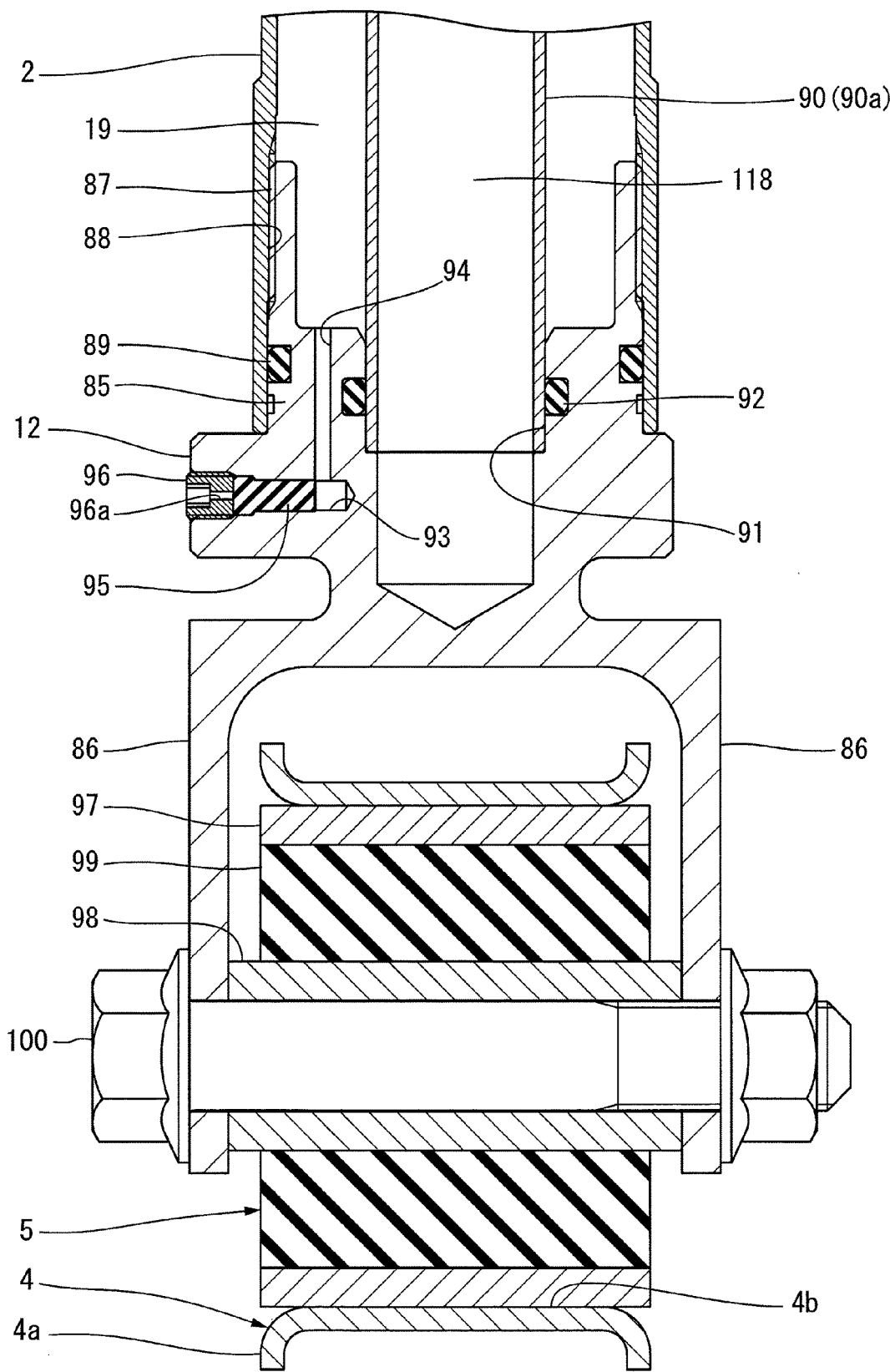
FIG. 6 is a cross-sectional view showing a cover member and wheel-side connecting member in an enlarged scale.

As shown in FIG. 6, the cover member 12 that closes the lower end portion of the cylinder 2 includes a closed-end cylindrical member 85 fitted in the lower end portion of the cylinder 2, and a pair of attaching plates 86 integral with the cylindrical member 85 and extending downward. A male screw 87 is provided in the upper end portion of the cylindrical member 85. On the other hand, a female screw 88 is provided in the lower end portion of the cylinder 2. The cover member 12 is attached to the cylinder 2 by screwing the male screw 87 of the cylindrical member 85 into the female screw 88 of the cylinder 2.

An O-ring 89 that seals a portion between the cylindrical member 85 and the cylinder 2 is attached to a portion of the outer circumferential portion of the cylindrical member 85, which is below the male screw 87.

A circular recess 91 in which the lower end portion of a pipe 90 (to be described below) is fitted and fixed is provided in the inner circumferential portion of the cylindrical member 85. The inner circumferential portion of the cylindrical member 85 is closed. In addition, an O-ring 92 that seals a portion between the cylindrical member 85 and pipe 90 is attached to the inner circumferential portion of the cylindrical member 85.

The lower end portion of the cylindrical member 85 is thicker than the lower end of the cylinder 2, thus defining a stopper to be used when the cylindrical member 85 is screwed into the cylinder 2. Also, in this lower end portion of the cylindrical member 85, a small hole 93 extending inward in the radial direction from the outer circumferential surface of the cover member 12 and a communication hole 94 allows the interior of the distal end portion of the small hole 93 to communicate with the interior of the cylindrical member 85 are provided. A rubber plug member 95 is held in a middle portion of the small hole 93. A plug 96 is threadably engaged with the opening of the small hole 93. A through hole 96a for pricking the plug member 95 with a gas injection needle (not shown) is provided in the plug 96. This needle is used to inject a gas into a space (the gas chamber 19) between the cylindrical member 85 and pipe 90. The gas is injected into the small hole 93 from the distal end portion of the needle extending through the plug member 95. The needle is pulled out from the plug member 95 after the gas is injected. When the needle is pulled out from the plug member 95, the pinhole of the plug member 95 closes, so the small hole 93 is closed by the plug member 95.

Note that although not shown, the gas may also be injected into the small hole 93 by using an on-off valve instead of the plug member 95. As an example of this on-off valve, it is possible to use a structure which opens when the gas is supplied or a gas supply device is connected, and closes when the supply of the gas stops or the gas supply device is removed. An on-off valve of this kind is threadably engaged with the atmosphere-side opening of the small hole 93 such that a gas supply port or a supply device connecting portion projects from the cover member 12.

The pair of attaching plates 86 in the lower end portion of the cover member 12 are used to attach the lower end portion of the hydraulic shock absorber 1 to a member (e.g., the lower arm 4) of the suspension, which moves together with a wheel with respect to the body of the vehicle. A connecting bracket 4a of the lower arm 4 of the suspension is attached to the attaching plates 86 according to the present preferred embodiment via the wheel-side connecting member 5.

The wheel-side connecting member 5 includes an outer cylinder 97, an inner cylinder 98 inserted into the outer cylinder 97, and a ring-shaped shock-absorbing rubber 99 arranged between the outer cylinder 97 and the inner cylinder 98. The shock-absorbing rubber 99 is baked onto the outer cylinder 97 and inner cylinder 98. The outer cylinder 97 is press-fitted, for example, in an attaching hole 4b in the connecting bracket 4a of the lower arm 4. The bracket 4a and wheel-side connecting member 5 are inserted between the pair of attaching plates 86, and fixed to the attaching plates 86 by a bolt 100, for example, inserted into the inner cylinder 98 so as to extend through these members.

As shown in FIG. 1, the pipe 90 fixed to the cover member 12 extends upward from the cover member 12 to a middle portion of the cylinder 2 in the vertical direction. The pipe 90 includes a small-diameter portion 90a fitted in the cover member 12 and a large-diameter portion 90b positioned in the upper end portion, and is positioned on the same axis as that of the cylinder 2.

Figure 7:
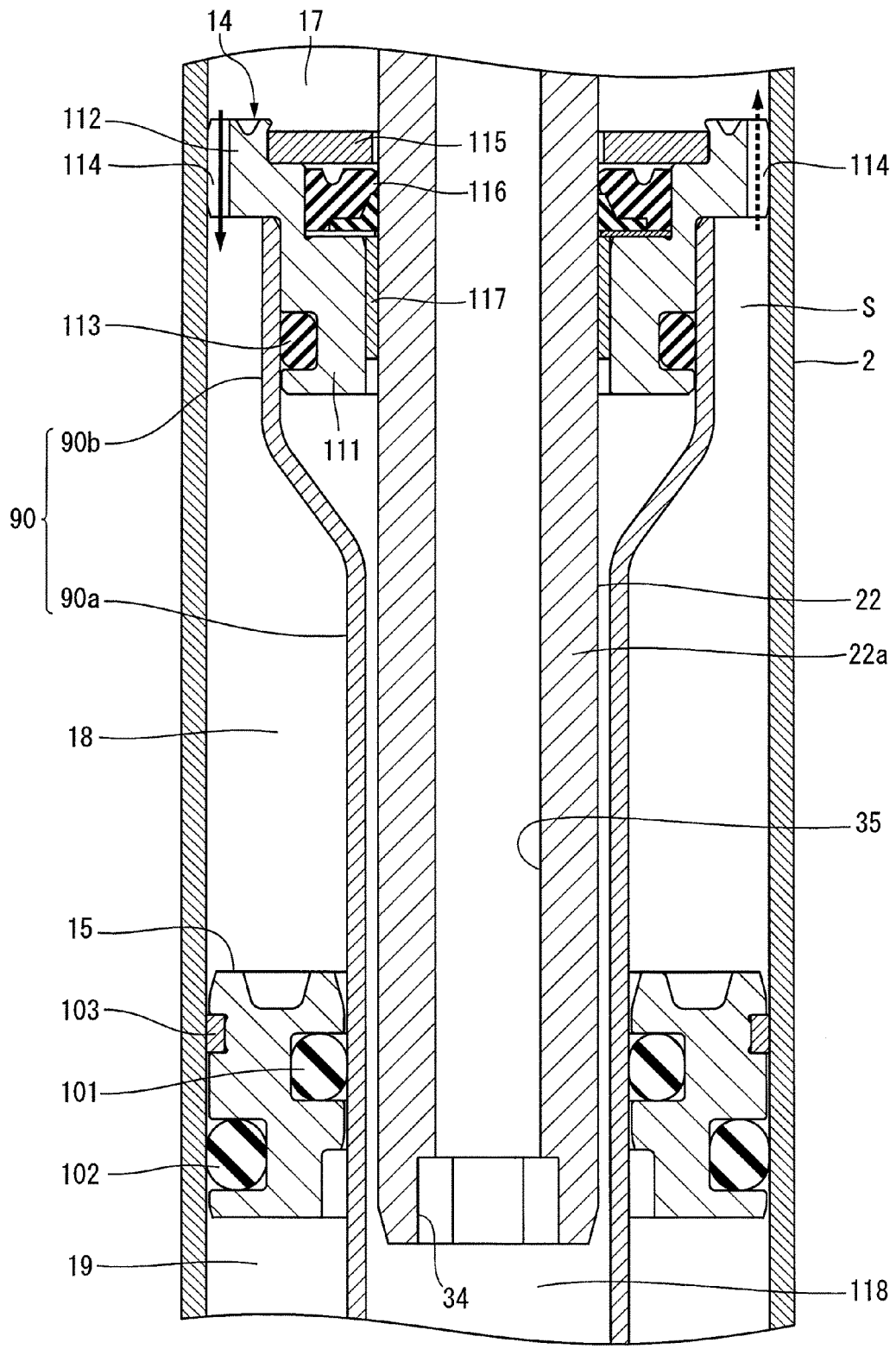
FIG. 7 is a cross-sectional view showing a portion of a pipe, a second support member, and a free piston in an enlarged scale.

As shown in FIG. 7, the inner diameter of the small-diameter portion 90a of the pipe 90 has a size by which the lower end portion (distal end portion) of the sub piston rod 22 is able to be inserted without any contact.

The free piston 15 is slidably fitted in the small-diameter portion 90a of the pipe 90. The free piston 15 preferably has a ring shape, and is slidably fitted in the pipe 90 and cylinder 2 so that the pipe 90 extends through the hollow portion. An O-ring 101 that seals a portion between the free piston 15 and the outer circumferential surface of the pipe 90 is attached to the inner circumferential portion of the free piston 15. An O-ring 102 and a bearing 103 that seal a portion between the free piston 15 and the inner circumferential surface of the cylinder 2 are attached to the outer circumferential portion of the free piston 15. More specifically, the outer circumferential portion of the free piston 15 is supported on the cylinder 2 by the bearing 103 adjacent to the third oil chamber 18 in the axial direction of the free piston 15 and the outer circumferential seal (O-ring 102) spaced apart from the bearing 103 on the gas chamber 19 side. The inner circumferential portion of the free piston 15 is supported on the pipe 90 by the inner circumferential seal (O-ring 101) positioned between the bearing 103 and the outer circumferential seal (O-ring 102) in the axial direction of the free piston.

The free piston 15 partitions the third oil chamber 18 and the gas chamber 19 in the cylinder 2. The third oil chamber 18 is located between the free piston 15 and the second support member 14 (to be described below) fixed to the large-diameter portion of the pipe 90. The gas chamber 19 is located between the free piston 15 and the cover member 12. The gas chamber 19 is filled with a gas having a pressure which pushes the free piston 15 toward the second support member 14. This filling of the gas is performed by pricking the plug member 95 in the cover member 12 with the gas injection needle.

The large-diameter portion 90b of the pipe 90 preferably has a cylindrical shape by molding a base material (not shown) of the pipe 90 such that the outer diameter is larger than the small-diameter portion 90a. As shown in FIG. 7, the outer diameter of the large-diameter portion 90b has a size by which a ring-shaped space S is provided between the large-diameter portion 90b and the inner circumferential surface of the cylinder 2.

Figure 8:
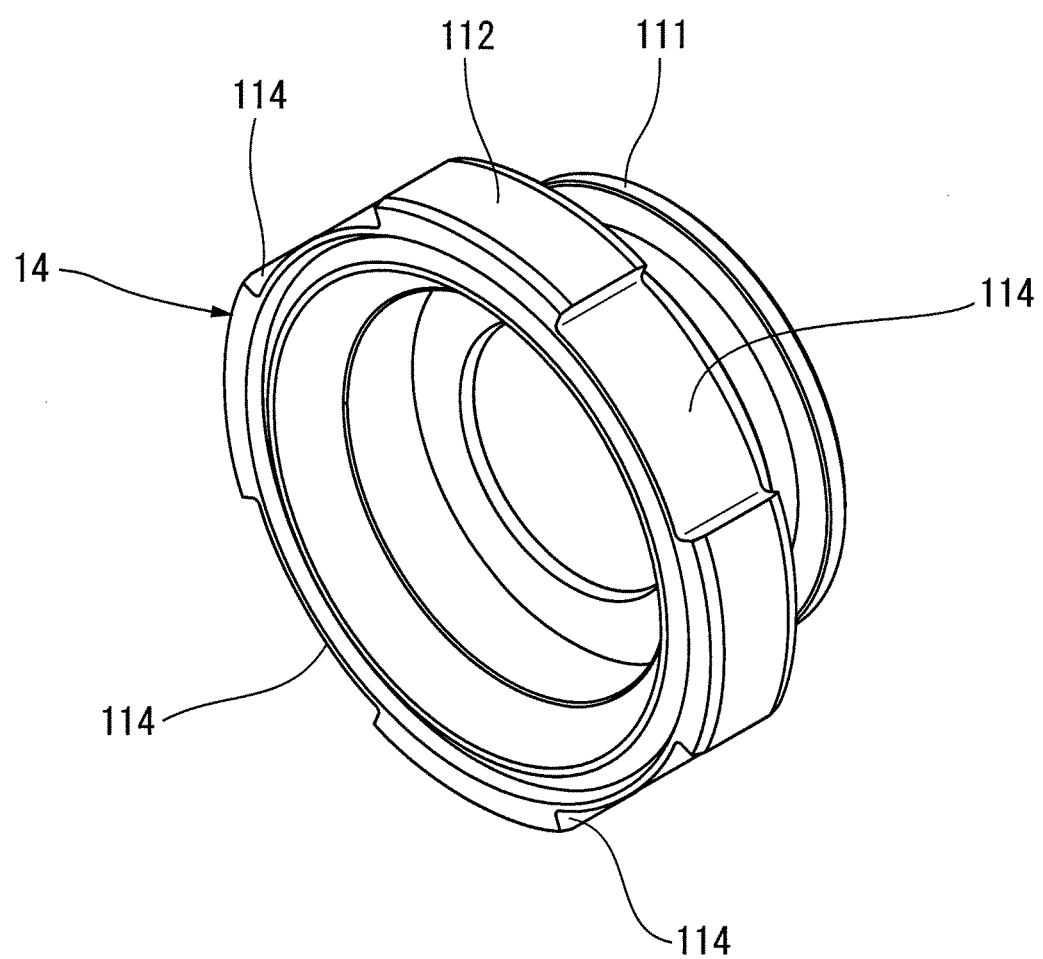
FIG. 8 is a perspective view of the second support member.

As shown in FIGS. 7 and 8, the second support member 14 includes a small-diameter portion 111 and large-diameter portion 112, and preferably has a cylindrical shape including an inner circumferential portion for slidably supporting the sliding portion 22a of the sub piston rod 22.

The small-diameter portion 111 of the second support member 14 is fitted in the large-diameter portion 90b of the pipe 90 described above, and fixed by press-fitting, for example. An O-ring 113 that seals a portion between the small-diameter portion 111 and the inner circumferential surface of the pipe 90 is attached to the small-diameter portion 111.

The large-diameter portion 112 of the second support member 14 (the outer circumferential portion of the second support member 14) is fitted in the cylinder 2 by a clearance-fit, and partitions the second oil chamber 17 and the third oil chamber 18 in the cylinder 2. The second oil chamber 17 is located between the piston 13 and the second support member 14. The third oil chamber 18 is located between the second support member 14 and the free piston 15.

A plurality of notches 114 extending in the axial direction of the second support member 14 are provided in the large-diameter portion 112. The notches 114 allow the second oil chamber 17 and the third oil chamber 18 to communicate with each other. The notches 114 according to the present preferred embodiment are provided in the large-diameter portion 112 of the second support member 14 so as to have a shape which partially widens the spacing between the large-diameter portion 112 and the inner circumferential surface of the cylinder 2. Also, as shown in FIG. 8, the notches 114 are arranged at predetermined intervals in the circumferential direction of the large-diameter portion 112.

The total cross-sectional area of the plurality of notches 114 (a cross-sectional area viewed in the axial direction of the second support member 14) has a value by which hydraulic oil is able to freely pass. This total cross-sectional area is equal to or larger than the difference between the cross-sectional area of the sliding portion 21a of the main piston rod 21 and the cross-sectional area of the sliding portion 22a of the sub piston rod 22. Accordingly, hydraulic oil is able to freely pass through the notches 114 as needed. In the present preferred embodiment, the plurality of notches 114 define "a second hydraulic oil passage".

In the inner circumferential portion of the second support member 14, a washer 115, an oil seal 116, and a bearing 117 are arranged in this order from above. The washer 115 prevents the removal of the oil seal 116 from the second support member 14, and is fixed in the large-diameter portion 112 by caulking, for example, the end surface of the large-diameter portion 112. The oil seal 116 seals a portion between the second support member 14 and the outer circumferential surface of the sub piston rod 22. The bearing 117 slidably supports the sub piston rod 22. The hollow portion of the second support member 14 is closed by the sub piston rod 22. The large-diameter portion 90b of the pipe 90 is closed by the small-diameter portion 111 of the second support member 14 and the sub piston rod 22. That is, in the hydraulic shock absorber 1, the interior of the pipe 90 is a closed space 118 so no dust enters the pipe 90 from the outside.

Accordingly, a material that does not have a dust seal function is able to be used as the oil seal 116 to seal the portion between the second support member 14 and the outer circumferential surface of the sub piston rod 22. When compared to a case in which a material having a dust seal function is used as the oil seal 116, the sliding resistance of the sub piston rod 22 is reduced, and the operability of the hydraulic shock absorber 1 is improved.

Next, the operation of the hydraulic shock absorber 1 according to the present preferred embodiment will be explained.

When the hydraulic shock absorber 1 expands and the piston 13 moves up (nearer to the first support member 11) in FIG. 1 with respect to the cylinder 2, the oil pressure is transmitted from the first oil chamber 16 to the second leaf springs 54 through the communication hole 48 and the tension-side oil hole 45 of the piston 13. If the oil pressure exceeds the initial set load of the second leaf springs 54, the hydraulic oil opens the second leaf springs 54 against their spring forces, and flows into the second oil chamber 17 from the tension-side oil hole 45. A damping force is generated when the hydraulic oil thus passes through the narrow gap between the second leaf springs 54 and the piston 13. The magnitude of this damping force changes in accordance with the aperture of the adjustable valve 24. The magnitude of the damping force is a maximum when the adjustable valve 24 is fully closed, and increases or decreases as the throttling amount of the adjustable valve 24 changes.

The outer diameter of the sliding portion 22a of the sub piston rod 22 is larger than the outer diameter of the sliding portion 21a of the main piston rod 21. Therefore, when the piston 13 moves up in FIG. 1 in the hydraulic shock absorber 1, the increase in volume of the sub piston rod 22 entering the second oil chamber 17 is larger than the decrease in volume of the main piston rod 21 leaving the first oil chamber 16. That is, the total quantity of the hydraulic oil having flowed into the second oil chamber 17 from the first oil chamber 16 cannot be accommodated in the second oil chamber 17.

In this case, as indicated by the solid-line arrow in FIG. 7, the hydraulic oil flows into the third oil chamber 18 from the second oil chamber 17 through the notches 114 of the second support member 14.

The total cross-sectional area of the notches 114 is equal to or larger than the difference between the cross-sectional area of the sliding portion 21a of the main piston rod 21 and the cross-sectional area of the sliding portion 22a of the sub piston rod 22. Since the hydraulic oil smoothly flows through the notches 114 as the piston 13 moves, no cavitation occurs in the oil chamber even when the moving velocity of the piston 13 is high.

On the other hand, when the hydraulic shock absorber 1 contracts and the piston 13 moves down (nearer to the second support member 14) in FIG. 1 with respect to the cylinder 2, the oil pressure is transmitted from the second oil chamber 17 to the first leaf springs 53 through the communication hole 49 and the compression-side oil hole 46 of the piston 13. If the oil pressure exceeds the initial set load of the first leaf springs 53, the hydraulic oil opens the first leaf springs 53 against their spring forces, and flows into the first oil chamber 16 from the compression-side oil hole 46. A damping force is generated when the hydraulic oil passes through the narrow gap between the first leaf springs 53 and the piston 13. In this case, the hydraulic oil flows into the second oil chamber 17 from the third oil chamber 18 through the notches 114 of the second support member 14. The direction in which the hydraulic oil flows at that time is a direction indicated by the broken-line arrow in FIG. 7. No cavitation occurs in the oil chamber in this case as well.

The hydraulic oil in the hydraulic shock absorber 1 is pressurized by the pressure of the gas in the gas chamber 19. Accordingly, a gas reaction force equivalent to the difference between the pressure-receiving area of the first oil chamber 16 and the pressure-receiving area of the second oil chamber 17 acts on the piston 13 even in the natural state. The pressure-receiving area of the first oil chamber 16 is larger than the pressure-receiving area of the second oil chamber 17. Therefore, this gas reaction force pushes the piston 13 toward the second support member 14. That is, the hydraulic shock absorber 1 contracts in the natural state. The piston 13 moves as it is pushed by the above-described gas reaction force until the washer 56 near the lower side of the piston 13 abuts against the washer 115 of the second support member 14.

To install the hydraulic shock absorber 1 that contracts in the natural state as described above in the suspension of the vehicle, the spring receiving member 84a is first attached to the cylinder 2 of the hydraulic shock absorber 1 by the C-ring 84b. Then, the main piston rod 21 is held in a state in which it projects from the cylinder 2 by a predetermined amount. The main piston rod 21 is projected from the cylinder 2 by using a dedicated tool (not shown), or supplying a gas to the closed space 118 in the pipe 90. After that, the coil spring 84 of the suspension is attached to the spring receiving member 84a, and the body-side connecting member 7 is attached to the main piston rod 21. An assembly including the hydraulic shock absorber 1 and the coil spring 84 is achieved by attaching the body-side connecting member 7 to the main piston rod 21.

After that, the body-side connecting member 7 positioned in the upper end of the assembly is attached to the body 6, and the cover member 12 positioned in the lower end of the assembly is attached to the lower arm 4 by the wheel-side connecting member 5. After the assembly is installed between the body 6 and the wheel side, the main piston rod 21 is released from being held. The release is performed by removing the tool holding the main piston rod 21, or exhausting the gas from the closed space 118.

When the hydraulic shock absorber 1 is installed in the suspension as described above, the weight of the vehicle is provided as a load to the shock-absorbing rubber 99 of the wheel-side connecting member 5. In the shock-absorbing rubber 99, a portion positioned above the inner cylinder 98 is pulled, and a portion positioned below the inner cylinder 98 is compressed in FIG. 6.

The hydraulic shock absorber 1 contracts in the natural state as described above. When the hydraulic shock absorber 1 is installed in the suspension, therefore, the initial set load is provided to the shock-absorbing rubber 28 of the body-side connecting member 7, and an initial deformation occurs.

In the shock-absorbing rubber 28 of the body-side connecting member 7, a portion positioned below the connecting plate 26 in FIG. 2 is compressed, and a portion positioned above the connecting plate 26 in FIG. 2 is pulled.

Figure 9A:
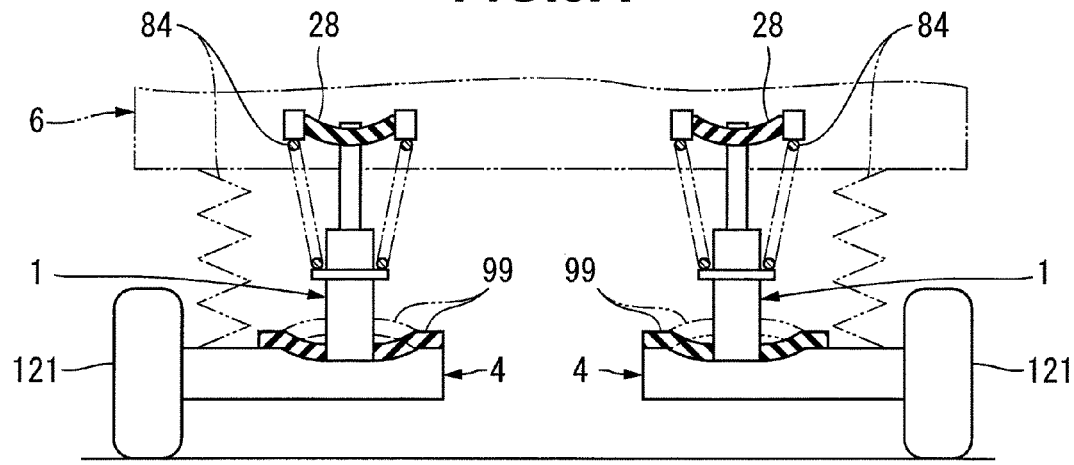
FIG. 9A is a view for explaining the operation of the hydraulic shock absorber, and shows a state in which the vehicle is standing still or running straight.
Figure 9B:
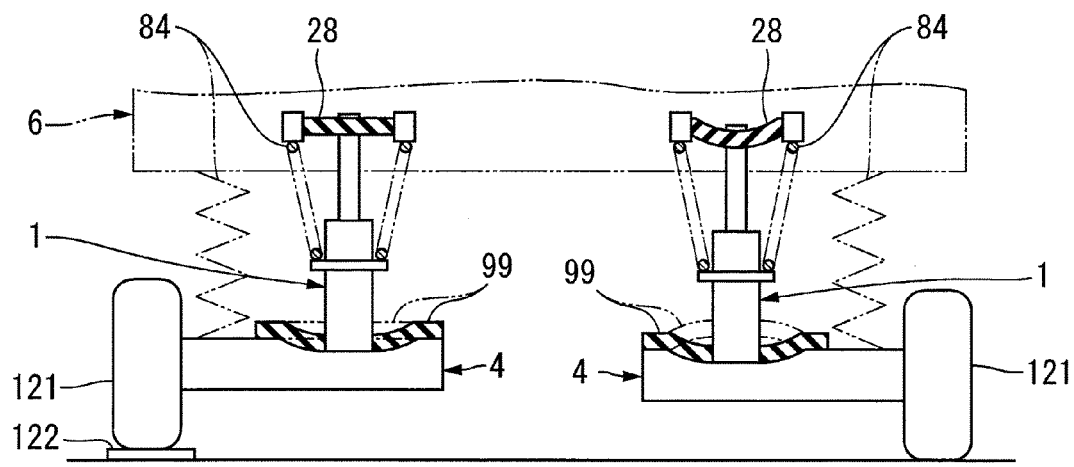
FIG. 9B is a view for explaining the operation of the hydraulic shock absorber, and shows a state in which a wheel rides over a small projection on a road.
Figure 9C:
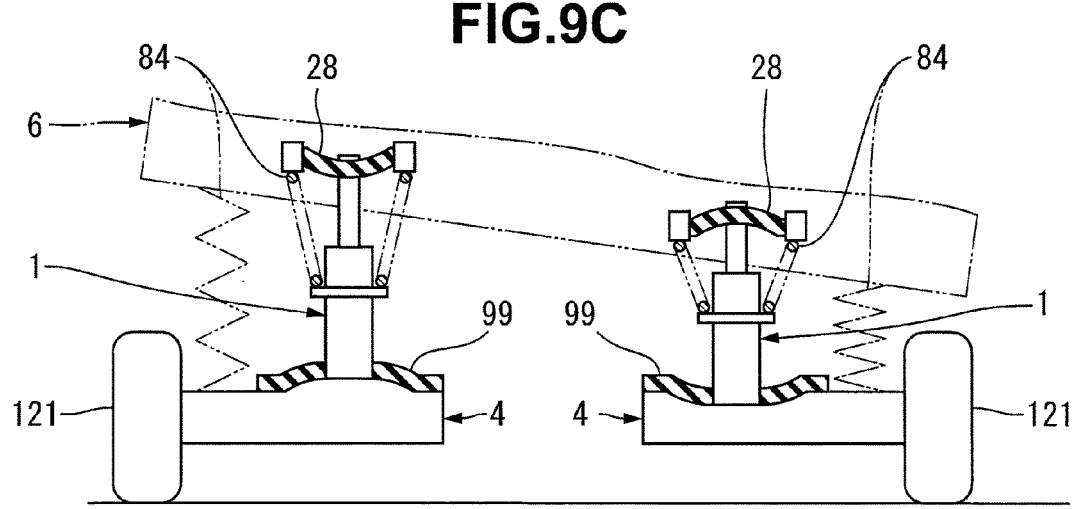
FIG. 9C is a view for explaining the operation of the hydraulic shock absorber, and shows a state in which the vehicle is turning.

The operation of the hydraulic shock absorber 1 installed in the vehicle will be explained with reference to FIGS. 9A to 9C. FIGS. 9A to 9C illustrate states in which the vehicle is viewed from behind. FIGS. 9A to 9C schematically show the hydraulic shock absorber 1 on the left side of the vehicle, the hydraulic shock absorber 1 on the right side of the vehicle, and the shock-absorbing rubbers 28 and 99 connected to the hydraulic shock absorbers 1. Also, FIGS. 9A to 9C each illustrate a state in which a wheel 121 is connected to the lower arm 4. Furthermore, each of FIGS. 9A to 9C shows the coil spring 84 of the suspension, which is installed independently of the hydraulic shock absorber 1, by the alternate long and two short dashed lines.

As shown in FIG. 9A, when the vehicle is standing still or running straight on a flat road surface, the shock-absorbing rubber 28 deforms as it is pulled toward the hydraulic shock absorber 1 by the gas reaction force. This deformation will simply be called an initial deformation hereinafter. The shock-absorbing rubber 99 deforms by the weight of the vehicle, and bends downward. When the vehicle runs in this state and the left wheel 121 rides over a small projection 122 on the road such as a white line, as shown in FIG. 9B, the hydraulic cylinder 1 displaces upward in the state in which the shock-absorbing rubber 28 has deformed by the initial deformation, so this initial deformation of the shock-absorbing rubber 28 is partially or entirely eliminated. In this case, the hydraulic shock absorber 1 is not operating (contracting), and the shock-absorbing rubber 28 reduces a shock to be transmitted from the wheel 121 to the body 6.

When the coil spring 84 is installed independently of the hydraulic shock absorber 1, the gas reaction force bends the shock-absorbing rubber 99 by the initial deformation into a shape which projects upward as indicated by the alternate long and two dashed lines in FIG. 9A. When the left wheel rides on the projection 122 such as a white line, the initial deformation of the shock-absorbing rubber 99 is partially or entirely eliminated as indicated by the alternate long and two short dashed lines in FIG. 9B. That is, in this case, both the shock-absorbing rubbers 28 and 99 reduce a shock to be transmitted from the wheel 121 to the body 6.

When the vehicle turns to, e.g., the left, as shown in FIG. 9C, the body 6 inclines by the centrifugal force such that the right side of the vehicle lowers. In this state, the shock-absorbing rubber 28 positioned on the right side of the body once eliminates the initial deformation from the state shown in FIG. 9A, and bends in the opposite direction. After the shock-absorbing rubber 28 cannot deform any more, the shock-absorbing rubber 28 transmits, to the hydraulic shock absorber 1, a force in a direction in which the hydraulic shock absorber 1 contracts. On the other hand, the shock-absorbing rubber 28 positioned on the left side of the body is already pulled by the gas reaction force, and hence immediately transmits, to the hydraulic shock absorber 1, a force in a direction in which the hydraulic shock absorber 1 expands. In this state, the load applied to the shock-absorbing rubber 99 positioned on the left side of the body is reduced because the left portion of the body 6 displaces upward. As a consequence, the shock-absorbing rubber 99 once eliminates the initial deformation from the state shown in FIG. 9A, and bends in the opposite direction as shown in FIG. 9C.

That is, in this state, the hydraulic shock absorber 1 on the right side of the body contracts, and the hydraulic shock absorber 1 on the left side of the body expands to generate a damping force. In the hydraulic shock absorber 1 positioned on the right side of the body, the initial deformation is eliminated in the shock-absorbing rubber 28 when the body 6 slightly lowers, and a damping force is generated immediately after the deformation which bends in the opposite direction as shown in FIG. 9C is complete. Note that when the coil spring 84 is installed independently of the hydraulic shock absorber 1, the initial deformation is eliminated in both the shock-absorbing rubbers 28 and 99.

In the hydraulic shock absorber 1 positioned on the left side of the body, the initial deformation is eliminated in the shock-absorbing rubber 99 when the body 6 starts inclining, and a damping force is generated immediately after the deformation which bends in the opposite direction is complete. Note that when the coil spring 84 is installed independently of the hydraulic shock absorber 1, a damping force is generated simultaneously with the start of inclination. Therefore, the body 6 turns to the left while slightly inclining to the right.

The turning performance of the vehicle and the responsiveness of the hydraulic shock absorber 1 as described above cannot be achieved by the hydraulic shock absorbers described in Japanese Patent No. 4996957 and Japanese Patent Publication No. 48-21039.

In the hydraulic shock absorber 1 according to the present preferred embodiment, when the piston 13 moves with respect to the cylinder 2, the hydraulic oil flows through the notches 114 of the second support member 14 at a flow rate equivalent to the difference between the cross-sectional area of the sliding portion 21a of the main piston rod 21 and the cross-sectional area of the sliding portion 22a of the sub piston rod 22. The total cross-sectional area of the notches 114 is equal to or larger than the difference between the cross-sectional area of the sliding portion 21a of the main piston rod 21 and the cross-sectional area of the sliding portion 22a of the sub piston rod 22. Since the hydraulic oil smoothly flows through the notches 114 as the piston 13 moves, no cavitation occurs in the oil chamber even when the moving velocity of the piston 13 is high.

In the hydraulic shock absorber 1 according to the present preferred embodiment, the operability of the piston rod 3 is improved, and it is possible to provide the initial set load to the shock-absorbing rubber 28 of the vehicle while preventing cavitation in the oil chamber. When the coil spring 84 of the suspension is installed independently of the hydraulic shock absorber 1, the initial set load is able to be provided to both of the shock-absorbing rubbers 28 and 99.

Consequently, the hydraulic shock absorber is able to improve the ride quality of a vehicle because no unnecessary shock is transmitted to the body 6 and a damping force is generated with high responsiveness to the behavior of the vehicle.

The notches 114 (the second hydraulic oil passage) of the second support member 14 according to the present preferred embodiment are provided in the outer circumferential portion of the second support member 14 so as to have a shape which partially widens the gap between the outer circumferential portion of the second support member 14 and the inner circumferential surface of the cylinder 2.

The notches 114 are arranged over a broad range of the second support member 14 except for a portion necessary to support the sub piston rod 22 (a portion that accommodates the oil seal 116 and bearing 117). Therefore, the notches 114 are able to be provided with few restrictions, and the hydraulic oil passage (second hydraulic oil passage) having a large cross-sectional area is easily provided by the notches 114.

Accordingly, a hydraulic shock absorber is provided in which cavitation hardly occurs.

The outer diameter of the sliding portion 22a of the sub piston rod 22 according to the present preferred embodiment is larger than the outer diameter of the sliding portion 21a of the main piston rod 21.

This causes the pressure receiving area of the second oil chamber 17 of the piston 13 to be smaller than the pressure receiving area of the first oil chamber 16. As a consequence, a gas reaction force equivalent to the difference between the pressure receiving areas acts on the piston 13, and moves the piston 13 toward the second support member 14. Therefore, the hydraulic shock absorber 1 according to the present preferred embodiment contracts in the natural state as described above.

When the hydraulic shock absorber 1 is assembled into the suspension of a vehicle, the shock-absorbing rubber 28 of the suspension is pulled by the hydraulic shock absorber 1, and the initial set load (a load which causes initial deformation) is provided to the shock-absorbing rubber 28. When the coil spring 84 of the suspension is installed independently of the hydraulic shock absorber 1, the initial set load is provided to both of the shock-absorbing rubbers 28 and 99.

When the wheel 121 rides over the small projection 122 on the road surface, the initial deformation of the shock-absorbing rubber 28 is partially or entirely eliminated, so the ride quality improves because no shock is transmitted to the body 6 even when the hydraulic shock absorber 1 is not operating. Note that when the coil spring 84 of the suspension is installed independently of the hydraulic shock absorber 1, the initial deformations of both of the shock-absorbing rubbers 28 and 99 are partially or entirely eliminated. Also, when the body 6 inclines to the right or left during cornering or the like, the hydraulic shock absorber 1 positioned inside the turn (the hydraulic shock absorber 1 which expands) generates a damping force at almost the same time the body starts inclining. Note that when the coil spring 84 of the suspension is installed independently of the hydraulic shock absorber 1, a damping force is generated at the same time the body starts inclining.

In the hydraulic shock absorber 1 positioned outside the turn, the initial deformation of at least the shock-absorbing rubber 28 is eliminated when the body slightly lowers, and a damping force is generated immediately after the deformation which bends in the opposite direction is complete. That is, the ride quality improves because the body hardly inclines.

The hydraulic shock absorber 1 according to the present preferred embodiment includes the hydraulic oil passage 74 (third hydraulic oil passage) allowing the first oil chamber 16 and the second oil chamber 17 to communicate with each other through the main piston rod 21. The hydraulic shock absorber 1 also includes the adjustable valve 24 that is able to change the cross-sectional area of the hydraulic oil passage 74.

Accordingly, the magnitude of the damping force to be generated in the hydraulic shock absorber 1 is able to be changed by changing the cross-sectional area of the hydraulic oil passage 74 by the adjustable valve 24.

In the present preferred embodiment, therefore, the magnitude of the damping force is adjusted in accordance with the type of vehicle in which the hydraulic shock absorber 1 is installed or in accordance with the preference of a passenger of the vehicle, so a hydraulic shock absorber is provided that further improves the ride quality.

The pipe 90 according to the present preferred embodiment includes the small-diameter portion 90a in which the free piston 15 is slidably fitted, and the large-diameter portion 90b which has an outer diameter larger than that of the small-diameter portion 90a and to which the second support member 14 is fixed. The second support member 14 is fixed as it is fitted in the large-diameter portion 90b of the pipe 90.

In the hydraulic shock absorber 1 according to the present preferred embodiment, the area of the contact portion between the second support member 14 and pipe 90 is larger than the area of the contact portion when the second support member 14 is fitted in the small-diameter portion 90a of the pipe 90.

In the present preferred embodiment, therefore, the second support member 14 is strongly fixed to the pipe 90, so the sub piston rod 22 is stably supported without being influenced by the magnitude of the oil pressure acting on the second support member 14. That is, the piston rod 3 smoothly operates.

Accordingly, the present preferred embodiment provides a hydraulic shock absorber that improves the ride quality because the operation when the hydraulic shock absorber 1 expands or contracts is smooth and causes no incongruity to a passenger.

Second Preferred Embodiment

Figure 10:
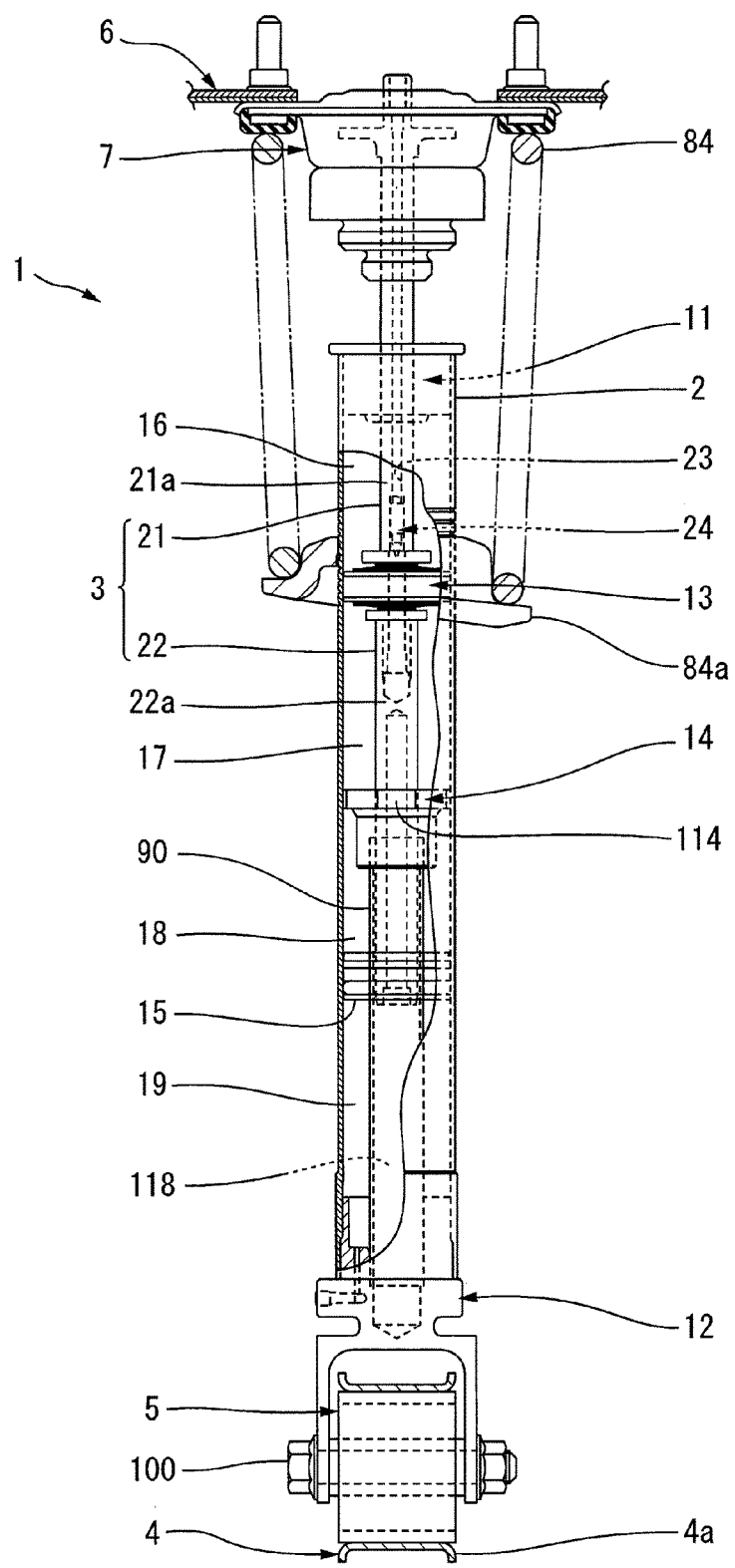
FIG. 10 is a cross-sectional view showing a preferred embodiment of the pipe.
Figure 11:
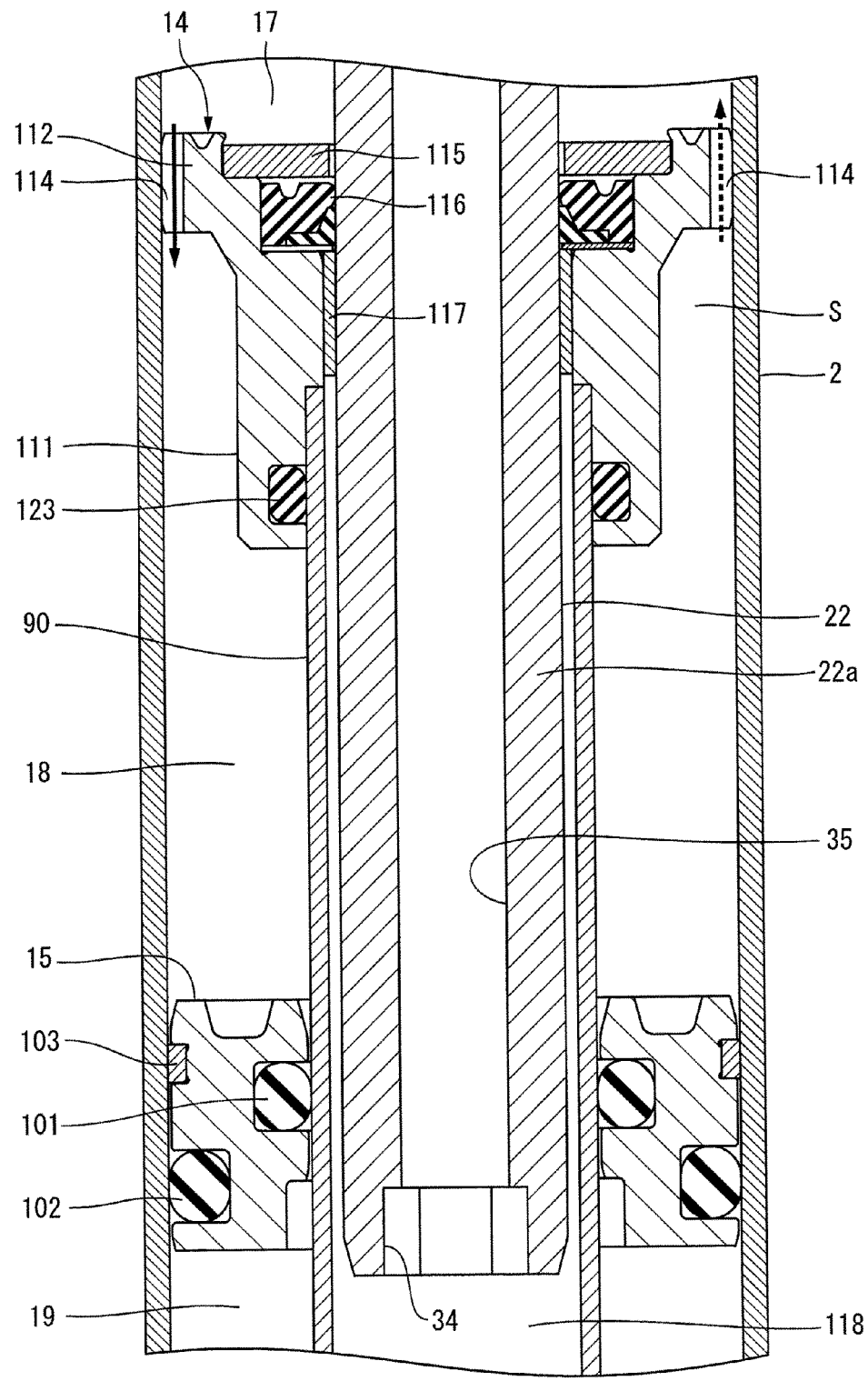
FIG. 11 is a cross-sectional view showing a portion of the pipe, the second support member, and the free piston in an enlarged scale.

The pipe and second support member may be provided as shown in FIGS. 10 and 11. The same or almost the same members as explained in FIGS. 1 to 9C are denoted by the same reference numerals in FIGS. 10 and 11, and a detailed explanation thereof will appropriately be omitted.

A pipe 90 shown in FIGS. 10 and 11 preferably has a shape having a constant outer diameter from one end to the other. A small-diameter portion 111 of a second support member 14 is elongated in the axial direction compared to that of the first preferred embodiment. The second support member 14 according to the present preferred embodiment is fixed to the pipe 90 such that the pipe 90 is fitted in the small-diameter portion 111. The pipe 90 is press-fitted, for example, in the small-diameter portion 111. An O-ring 123 that seals a portion between the small-diameter portion 111 and the outer circumferential surface of the pipe 90 is attached to the small-diameter portion 111.

The pipe 90 having a constant outer diameter as described above makes it possible to use a product manufactured at low cost by mass-production. Accordingly, the present preferred embodiment provides a hydraulic shock absorber which not only improves the ride quality when installed in a vehicle, but also decreases the manufacturing cost.

Third Preferred Embodiment

Figure 12:
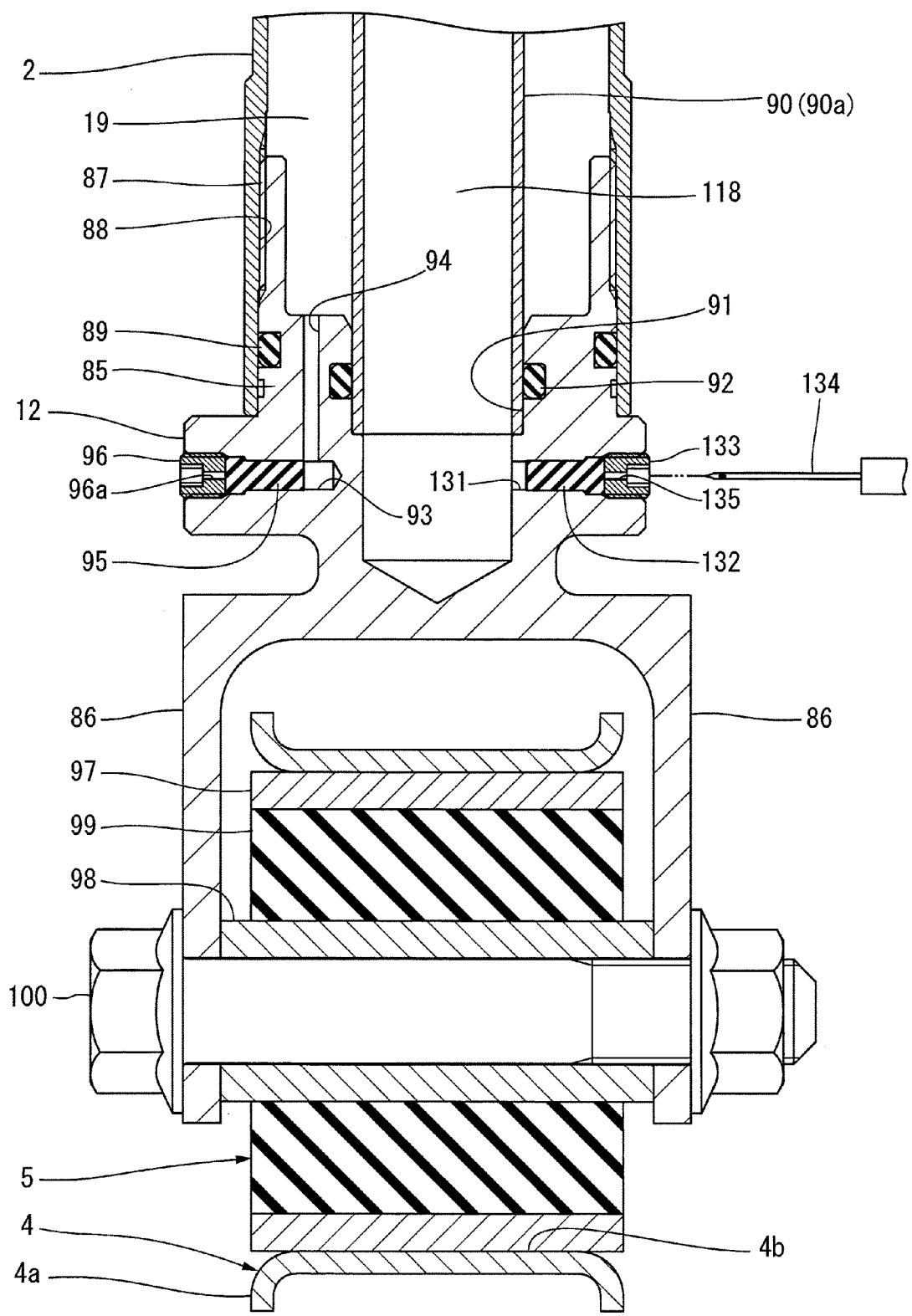
FIG. 12 is a cross-sectional view showing a preferred embodiment of the cover member.

The cover member may also be provided as shown in FIG. 12.

The same or almost the same members as explained in FIGS. 1 to 11 are denoted by the same reference numerals in FIG. 12, and a detailed explanation thereof will appropriately be omitted.

A gas supply passage 131 that defines a circular recess 91 and the outside of a cover member 12 shown in FIG. 12 communicate with each other is provided in the cover member 12. One end of the gas supply passage 131 according to the present preferred embodiment opens to the inner circumferential surface of the circular recess 91. The gas supply passage 131 extends from the one end in the radial direction of the cover member 12. The other end of the gas supply passage 131 opens to the outer circumferential surface of the cover member 12. That is, the gas supply passage 131 is connected to a closed space 118 in a pipe 90 via the circular recess 91.

A rubber plug member 132 is held in the middle portion of the gas supply passage 131. A plug 133 is threadably engaged with the opening of the gas supply passage 131. A through hole 135 for pricking the plug member 132 with a gas injection needle 134 is provided in the plug 133. The needle 134 is used to inject a gas into the closed space 118 in the pipe 90. The gas is discharged into the gas supply passage 131 from the distal end portion of the needle 134 extending through the plug member 132.

The gas to be supplied to the gas supply passage 131 is a gas having a pressure which cancels a gas reaction force generated by the difference between the cross-sectional area of a sliding portion 21a of a main piston rod 21 and the cross-sectional area of a sliding portion 22a of a sub piston rod 22, or a pressure higher than that. When the gas is supplied to the gas supply passage 131 by using the needle 134, the internal pressures of the gas supply passage 131 and the closed space 118 rise. When the gas is exhausted from the gas supply passage 131 through the needle 134, the internal pressures of the gas supply passage 131 and the closed space 118 fall. When the needle 134 is pulled out from the plug member 132, the pinhole of the plug member 132 is closed by elasticity, and the gas supply passage 131 and the closed space 118 are closed in a predetermined low-pressure state. "The low-pressure state" as described herein is a state at the atmospheric pressure or a pressure slightly higher than the atmospheric pressure.

As described above, the closed space 118 in the pipe 90 according to the present preferred embodiment is connected to the gas supply passage 131 which is able to be switched between the state in which the gas is supplied and the pressure rises, and the state in which the gas is exhausted and the space is closed at a predetermined low pressure. When the gas is supplied from the gas supply passage 131 to the closed space 118, the gas pressure acts on the sub piston rod 22, and the main piston rod 21 moves together with the sub piston rod 22 in a direction in which the main piston rod 21 projects from a cylinder 2.

Consequently, when assembling a hydraulic shock absorber 1 which contracts in the natural state into a suspension of a vehicle, the total length of the hydraulic shock absorber 1 is able to be adjusted in accordance with the installation position of the suspension. Accordingly, the present preferred embodiment provides a hydraulic shock absorber which is easily be assembled into a suspension.

The present preferred embodiment uses the rubber plug member 132 in order to close the gas supply passage 131. However, the present invention is not limited to this. Although not shown, an on-off valve may be used to close the gas supply passage 131. As an example of this on-off valve, it is possible to use a structure which opens when a gas is supplied or a gas supply device is connected, and closes when the supply of the gas stops or the gas supply device is removed. Examples of an on-off valve having this structure include, for example, an English Valve, an American Valve, and a French Valve widely used in automobiles and automobile tires. An on-off valve of this kind is threadably engaged with the atmosphere-side opening of the gas supply passage 131 such that a gas supply port or a supply device connecting portion projects from the cover member 12.

In each of the above-described first to third preferred embodiments, it is disclosed that the outer diameter of the sliding portion 22a of the sub piston rod 22 preferably is larger than that of the sliding portion 21a of the main piston rod 21. However, the present invention is not limited to this. That is, the hydraulic shock absorber 1 according to the present invention may be provided in which the outer diameter of the sliding portion 21a of the main piston rod 21 is larger than the outer diameter of the sliding portion 22a of the sub piston rod 22. The hydraulic shock absorber 1 using this arrangement expands in the natural state, and provides an initial set load (a load which causes initial deformation) to the shock-absorbing rubber when assembled into a suspension of a vehicle. Accordingly, the same effect as that of the first preferred embodiment is obtained even when using this arrangement.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A hydraulic shock absorber comprising:
a cylinder;

a first support member at a first end portion of the cylinder;

a cover member that closes a second end portion of the cylinder;

a main piston rod slidably extending through the first support member;

a sub piston rod positioned on a same axis as that of the main piston rod, and connected to a first end portion of the main piston rod which is positioned inside the cylinder;

a pipe arranged in the cylinder in a state in which the pipe is positioned on the same axis as that of the main piston rod and the sub piston rod, and including a first end portion fixed to the cover member and a second end portion into which a distal end portion of the sub piston rod is inserted;

a second support member fixed to the second end portion of the pipe, and including an outer circumferential portion having a diameter larger than a diameter of the pipe, fitted on an inner circumferential surface of the cylinder, and further including an inner circumferential portion which slidably supports the distal end portion of the sub piston rod;

a piston slidably fitted in the cylinder in a state in which the piston is fixed between the main piston rod and the sub piston rod, and defining a first oil chamber between the piston and the first support member and a second oil chamber between the piston and the second support member;

a free piston slidably fitted between the pipe and the cylinder such that the pipe extends through the free piston, and defining a third oil chamber between the free piston and the second support member and a gas chamber between the free piston and the cover member;

a first hydraulic oil passage that communicates the first oil chamber with the second oil chamber;

a valve in the first hydraulic oil passage; and a second hydraulic oil passage in the second support member such that hydraulic oil is able to freely pass, and communicates the second oil chamber with the third oil chamber; wherein the first oil chamber, the second oil chamber, and the third oil chamber are filled with the hydraulic oil;

the gas chamber is filled with a gas having a pressure which pushes the free piston toward the second support member;

a closed space in the pipe;

an outer diameter of a sliding portion of the main piston rod differs from an outer diameter of a sliding portion of the sub piston rod; and a total cross-sectional area of the second hydraulic oil passage is not less than a difference between a cross-sectional area of the sliding portion of the main piston rod and a cross-sectional area of the sliding portion of the sub piston rod.

2. The hydraulic shock absorber according to claim 1, wherein the second hydraulic oil passage is provided in an outer circumferential portion of the second support member, and has a shape which partially widens a gap between the outer circumferential portion of the second support member and the inner circumferential surface of the cylinder.

3. The hydraulic shock absorber according to claim 1, wherein the outer diameter of the sliding portion of the sub piston rod is larger than the outer diameter of the sliding portion of the main piston rod.

4. The hydraulic shock absorber according to claim 3, wherein the closed space is connected to a gas supply passage which is able to be switched between a state in which a gas is supplied and a pressure rises, and a state in which the gas is exhausted and the gas supply passage is closed in a low pressure state; and the gas to be supplied to the gas supply passage is a gas having a pressure which cancels a gas reaction force generated by the difference between the cross-sectional area of the sliding portion of the main piston rod and the cross-sectional area of the sliding portion of the sub piston rod, or a pressure higher than the difference.

5. The hydraulic shock absorber according to claim 1, further comprising:

a third hydraulic oil passage in the main piston rod or the sub piston rod, and that communicates the first oil chamber with the second oil chamber; and an adjustable valve that changes a cross-sectional area of the third hydraulic oil passage.

6. The hydraulic shock absorber according to claim 1, wherein the pipe includes a smaller-diameter portion in which the free piston is slidably fitted, and a larger-diameter portion which has an outer diameter larger than an outer diameter of the smaller-diameter portion and to which the second support member is fixed; and the second support member is fixed such that the second support member is fitted in the larger-diameter portion.

7. The hydraulic shock absorber according to claim 1, wherein the pipe has a shape having a constant outer diameter from one end to the other end, and the second support member is fixed to the pipe such that the pipe is fitted in the inner circumferential portion.

8. The hydraulic shock absorber according to claim 1, wherein the free piston has a ring shape including an outer circumferential portion slidably fitted in the cylinder and a hollow portion through which the pipe extends;

the outer circumferential portion of the free piston is supported on the cylinder by a bearing adjacent to the third oil chamber in an axial direction of the free piston and an outer circumferential seal spaced apart from the bearing on a side of the gas chamber; and an inner circumferential portion of the free piston is supported on the pipe by an inner circumferential seal positioned between the bearing and the outer circumferential seal in the axial direction.

\* \* \* \* \*